(12) United States Patent
Sun et al.

(10) Patent No.: US 9,758,655 B2
(45) Date of Patent: *Sep. 12, 2017

(54) CELLULAR POLYMERIC MATERIAL

(71) Applicant: Berry Plastics Corporation, Evansville, IN (US)

(72) Inventors: David Dezhou Sun, Evansville, IN (US); John B Euler, Evansville, IN (US)

(73) Assignee: Berry Plastics Corporation, Evansville, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/858,158

(22) Filed: Sep. 18, 2015

(65) Prior Publication Data

US 2016/0083569 A1    Mar. 24, 2016

Related U.S. Application Data

(60) Provisional application No. 62/052,296, filed on Sep. 18, 2014.

(51) Int. Cl.
    *C08L 23/12* (2006.01)

(52) U.S. Cl.
    CPC ........... *C08L 23/12* (2013.01); *C08L 2203/14* (2013.01); *C08L 2205/025* (2013.01); *C08L 2205/03* (2013.01); *C08L 2205/24* (2013.01)

(58) Field of Classification Search
    CPC .............. C08L 23/12; C08L 2205/03; C08L 2205/025; C08L 23/0815; C08L 2203/14; C08L 2205/24; C08K 3/34
    USPC .......................................... 524/451; 525/240
    See application file for complete search history.

(56) References Cited

U.S. PATENT DOCUMENTS

| | | |
|---|---|---|
| 1,396,282 A | 11/1921 | Penn |
| 1,435,120 A | 11/1922 | Holman |
| 1,920,529 A | 8/1933 | Sidebotham |
| 1,969,030 A | 8/1934 | Page |
| 2,097,899 A | 12/1935 | Smith |
| 2,809,776 A | 3/1956 | Barrington |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |

(Continued)

FOREIGN PATENT DOCUMENTS

| | | |
|---|---|---|
| AQ | 2291607 | 6/2000 |
| CA | 2765489 | 12/2010 |

(Continued)

OTHER PUBLICATIONS

Office Action dated Dec. 31, 2015 for U.S. Appl. No. 14/755,546.

(Continued)

*Primary Examiner* — Josephine Chang
(74) *Attorney, Agent, or Firm* — Barnes & Thornburg LLP

(57) ABSTRACT

A formulation of material includes a polymeric material, a nucleating agent, and a surface active agent. The formulation of material may be polymeric materials that relate morphology and crystalline structure of cellular polymeric material that may be used to form usable articles, such as an insulated container useful for containing food or liquid.

14 Claims, 19 Drawing Sheets

(56) References Cited

U.S. PATENT DOCUMENTS

| | | |
|---|---|---|
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Gilbert |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,733,381 A | 5/1973 | Willette |
| 3,793,283 A | 2/1974 | Frailey |
| 3,846,349 A | 11/1974 | Harada |
| 3,907,193 A | 9/1975 | Heller |
| 3,919,368 A | 11/1975 | Seto |
| RE28,658 E | 12/1975 | Macdaniel |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,240,568 A | 12/1980 | Pool |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,490,130 A | 12/1984 | Konzal |
| 4,550,046 A | 10/1985 | Miller |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,878,970 A | 11/1989 | Schubert |
| 4,918,112 A | 4/1990 | Roox |
| 4,940,736 A | 7/1990 | Alteepping |
| 5,078,817 A | 1/1992 | Takagaki |
| 5,116,881 A | 5/1992 | Park |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |
| 5,308,568 A | 5/1994 | Lipp |
| 5,348,795 A | 9/1994 | Park |
| 5,366,791 A | 11/1994 | Carr |
| 5,385,260 A | 1/1995 | Gatcomb |
| 5,443,769 A | 8/1995 | Karabedian |
| 5,445,315 A | 8/1995 | Shelby |
| 5,490,631 A | 2/1996 | Iioka |
| 5,507,640 A | 4/1996 | Gilmer |
| 5,547,124 A | 8/1996 | Mueller |
| 5,549,864 A | 8/1996 | Greene |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,866,053 A | 2/1999 | Park |
| 5,868,309 A | 2/1999 | Sandstrom |
| 5,895,614 A | 4/1999 | Rivera |
| 5,925,450 A | 7/1999 | Karabedian |
| 5,928,741 A | 7/1999 | Andersen |
| 5,944,225 A | 8/1999 | Kawolics |
| 5,948,839 A | 9/1999 | Chatterjee |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,071,580 A | 6/2000 | Bland |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,174,930 B1 | 1/2001 | Agarwal |
| 6,218,023 B1 | 4/2001 | DeNicola |
| 6,231,942 B1 | 5/2001 | Blizard |
| 6,235,380 B1 | 5/2001 | Tupil |
| 6,251,319 B1 | 6/2001 | Tusim |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,328,916 B1 | 12/2001 | Nishikawa |
| 6,376,059 B1 | 4/2002 | Anderson |
| 6,378,733 B1 | 4/2002 | Boonzaier |
| 6,379,802 B2 | 4/2002 | Ito |
| 6,383,425 B1 | 5/2002 | Wu |
| 6,420,024 B1 | 7/2002 | Perez |
| 6,444,073 B1 | 9/2002 | Reeves |
| 6,455,150 B1 | 9/2002 | Sheppard |
| 6,468,451 B1 | 10/2002 | Perez |
| 6,472,473 B1 | 10/2002 | Ansems |
| RE37,932 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |
| 6,811,843 B2 | 11/2004 | DeBraal |
| 6,814,253 B2 | 11/2004 | Wong |
| 6,875,826 B1 | 4/2005 | Huovinen |
| 6,883,677 B2 | 4/2005 | Goeking |
| 6,884,377 B1 | 4/2005 | Burnham |
| 6,884,851 B2 | 4/2005 | Gauthy |
| 6,908,651 B2 | 6/2005 | Watanabe |
| 6,926,507 B2 | 8/2005 | Cardona |
| 6,926,512 B2 | 8/2005 | Wu |
| 6,982,107 B1 | 1/2006 | Hennen |
| 7,056,563 B2 | 6/2006 | Halabisky |
| 7,070,852 B1 | 7/2006 | Reiners |
| 7,074,466 B2 | 7/2006 | DeBraal |
| 7,094,463 B2 | 8/2006 | Haas |

(56) References Cited

U.S. PATENT DOCUMENTS

| | | |
|---|---|---|
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Herbert |
| 7,281,650 B1 | 10/2007 | Milan |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,404 B2 | 7/2010 | Burgun |
| 7,786,216 B2 | 8/2010 | Soediono |
| 7,787,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,922,971 B2 | 4/2011 | Robertson |
| 7,928,162 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,234 B2 | 2/2012 | Weaver |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,404,780 B2 | 3/2013 | Weaver |
| 8,435,615 B2 | 5/2013 | Tsuchida |
| 8,679,620 B2 | 3/2014 | Matsushita |
| 8,715,449 B2 | 5/2014 | Leser |
| 8,721,823 B2 | 5/2014 | Vaideeswaran |
| 8,883,280 B2 | 11/2014 | Leser |
| 9,067,705 B2 | 6/2015 | Leser |
| 9,180,995 B2 | 11/2015 | Iyori |
| 9,358,772 B2 | 6/2016 | Leser |
| 2001/0010848 A1 | 8/2001 | Usui |
| 2001/0010849 A1 | 8/2001 | Blizard |
| 2001/0038893 A1 | 11/2001 | Mohan |
| 2001/0041236 A1 | 11/2001 | Usui |
| 2002/0030296 A1 | 3/2002 | Geddes |
| 2002/0041046 A1 | 4/2002 | Hartjes |
| 2002/0058126 A1 | 5/2002 | Kannankeril |
| 2002/0135088 A1 | 9/2002 | Harfmann |
| 2002/0137851 A1 | 9/2002 | Kim |
| 2002/0144769 A1 | 10/2002 | Debraal |
| 2002/0172818 A1 | 11/2002 | DeBraal |
| 2003/0003251 A1 | 1/2003 | DeBraal |
| 2003/0017284 A1 | 1/2003 | Watanabe |
| 2003/0021921 A1 | 1/2003 | DeBraal |
| 2003/0029876 A1 | 2/2003 | Giraud |
| 2003/0108695 A1 | 6/2003 | Freek |
| 2003/0138515 A1 | 7/2003 | Harfmann |
| 2003/0211310 A1 | 11/2003 | Haas |
| 2003/0228336 A1 | 12/2003 | Gervasio |
| 2003/0232210 A1 | 12/2003 | Haas |
| 2004/0013830 A1 | 1/2004 | Nonomura |
| 2004/0031714 A1 | 2/2004 | Hanson |
| 2004/0038018 A1 | 2/2004 | Anderson |
| 2004/0062885 A1 | 4/2004 | Imanari |
| 2004/0115418 A1 | 6/2004 | Anderson |
| 2004/0170814 A1 | 9/2004 | VanHandel |
| 2005/0003122 A1 | 1/2005 | Debraal |
| 2005/0006449 A1 | 1/2005 | DAmato |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0094577 A1 | 5/2006 | Mannlein |
| 2006/0095151 A1 | 5/2006 | Mannlein |
| 2006/0108409 A1 | 5/2006 | Pyper |
| 2006/0135699 A1 | 6/2006 | Li |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |

(56) References Cited

U.S. PATENT DOCUMENTS

| | | |
|---|---|---|
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | LiPiShan |
| 2008/0020162 A1 | 1/2008 | Fackler |
| 2008/0045638 A1 | 2/2008 | Chapman |
| 2008/0118738 A1 | 5/2008 | Boyer |
| 2008/0121681 A1 | 5/2008 | Wiedmeyer |
| 2008/0138593 A1 | 6/2008 | Martinez |
| 2008/0156857 A1 | 7/2008 | Johnston |
| 2008/0177242 A1 | 7/2008 | Chang |
| 2008/0227877 A1 | 9/2008 | Stadlbauer |
| 2008/0234435 A1 | 9/2008 | Chang |
| 2008/0260996 A1 | 10/2008 | Heilman |
| 2008/0269388 A1 | 10/2008 | Markovich |
| 2008/0280517 A1 | 11/2008 | Chang |
| 2008/0281037 A1 | 11/2008 | Karjala |
| 2008/0311812 A1 | 12/2008 | Arriola |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0275690 A1 | 11/2009 | Weaver |
| 2009/0324914 A1 | 12/2009 | Lieng |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0116422 A1 | 5/2010 | Vaideeswaran |
| 2010/0137118 A1 | 6/2010 | Chang |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0240818 A1 | 9/2010 | Walton |
| 2010/0279571 A1 | 11/2010 | Poon |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |
| 2011/0318560 A1 | 12/2011 | Yun |
| 2012/0004087 A1 | 1/2012 | Tharayil |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0032963 A1 | 2/2013 | Tokiwa |
| 2013/0052385 A1 | 2/2013 | Leser |
| 2013/0140320 A1 | 6/2013 | Nadella |
| 2013/0216744 A1 | 8/2013 | Liao |
| 2013/0280517 A1 | 10/2013 | Buehring |
| 2013/0303645 A1 | 11/2013 | Dix |
| 2014/0131430 A1 | 5/2014 | Leser |
| 2014/0263367 A1 | 9/2014 | Robertson |
| 2015/0250342 A1 | 9/2015 | Euler |
| 2015/0258771 A1 | 9/2015 | Leser |

FOREIGN PATENT DOCUMENTS

| | | |
|---|---|---|
| CN | 1288427 | 3/2001 |
| CN | 1495100 | 5/2004 |
| CN | 1942370 | 4/2007 |
| CN | 101370873 | 2/2009 |
| CN | 101429309 | 5/2009 |
| CN | 101531260 | 9/2009 |
| CN | 101538387 | 9/2009 |
| CN | 102115561 | 7/2011 |
| CN | 102245368 | 11/2011 |
| CN | 102391570 | 3/2012 |
| CN | 102762350 | 10/2012 |
| CN | 102115561 | 2/2013 |
| CO | 102089370 | 6/2011 |
| DE | 2831240 | 1/1980 |
| DE | 2831240 C | 3/1988 |
| DE | 102006025612 | 11/2007 |

(56) References Cited

FOREIGN PATENT DOCUMENTS

| | | |
|---|---|---|
| DE | 102006025612 A1 | 11/2007 |
| EP | 0001791 | 5/1979 |
| EP | 0086869 | 8/1983 |
| EP | 0161597 | 11/1985 |
| EP | 0318167 | 5/1989 |
| EP | 0520028 | 12/1992 |
| EP | 0570221 | 11/1993 |
| EP | 0588321 | 3/1994 |
| EP | 0659647 | 6/1995 |
| EP | 0879844 | 11/1998 |
| EP | 0972727 | 1/2000 |
| EP | 0796199 | 2/2001 |
| EP | 0940240 | 10/2002 |
| EP | 1308263 | 5/2003 |
| EP | 1323779 | 7/2003 |
| EP | 1479716 | 11/2004 |
| EP | 1666530 | 6/2006 |
| EP | 1754744 | 2/2007 |
| EP | 1921023 A1 | 5/2008 |
| EP | 1939099 | 7/2008 |
| EP | 2266894 | 12/2010 |
| EP | 2386584 A1 | 11/2011 |
| EP | 2386601 | 11/2011 |
| EP | 2720954 | 4/2014 |
| GB | 1078326 | 8/1967 |
| GB | 2485077 | 5/2012 |
| JP | 52123043 | 10/1977 |
| JP | 52123043 U | 10/1977 |
| JP | 58029618 | 2/1983 |
| JP | H02129040 U | 5/1990 |
| JP | H02269683 | 11/1990 |
| JP | H0543967 | 6/1993 |
| JP | 0615751 | 1/1994 |
| JP | 3140847 | 1/1994 |
| JP | 06192460 | 7/1994 |
| JP | P310847 | 12/2000 |
| JP | 2001310429 | 11/2001 |
| JP | 2003292663 | 10/2003 |
| JP | 2003321566 | 11/2003 |
| JP | 2004018101 | 1/2004 |
| JP | 2004168421 | 6/2004 |
| JP | 2004168421 A | 6/2004 |
| JP | 2006096390 | 4/2006 |
| JP | 2006130814 A | 5/2006 |
| JP | 2006142008 A | 6/2006 |
| JP | 2007154172 | 6/2007 |
| JP | 2008162700 | 7/2008 |
| JP | 2009504858 | 2/2009 |
| JP | 2009066856 A | 4/2009 |
| JP | 2009126922 | 6/2009 |
| JP | 2009138029 | 6/2009 |
| JP | 2009190756 A | 8/2009 |
| JP | 2010173258 | 8/2010 |
| KR | 100306320 | 10/2001 |
| KR | 2003036558 | 5/2003 |
| KR | 2004017234 | 2/2004 |
| KR | 101196666 | 11/2012 |
| TK | 9113933 | 9/1991 |
| TK | 9413460 | 6/1994 |
| TK | 2010076701 A1 | 7/2010 |
| TK | 2011036272 | 3/2011 |
| TK | 2011141044 | 11/2011 |
| TK | 2012173873 | 12/2012 |
| TN | 2006124369 | 11/2006 |
| WO | 9413460 | 6/1994 |
| WO | 9729150 | 8/1997 |
| WO | 1998016575 | 4/1998 |
| WO | 0002800 | 1/2000 |
| WO | 0119733 | 3/2001 |
| WO | 0132758 | 5/2001 |
| WO | 0153079 | 7/2001 |
| WO | 0234824 | 5/2002 |
| WO | 03076497 | 9/2003 |
| WO | 03099913 | 12/2003 |
| WO | 2004104075 | 12/2004 |
| WO | 2006042908 | 4/2006 |
| WO | 2007003523 | 1/2007 |
| WO | 2007020074 | 2/2007 |
| WO | 2007068766 | 6/2007 |
| WO | 2007090845 A2 | 8/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008145267 | 12/2008 |
| WO | 2009035580 | 3/2009 |
| WO | 2010006272 | 1/2010 |
| WO | 2010019146 | 2/2010 |
| WO | 2010111869 | 10/2010 |
| WO | 2011005856 | 1/2011 |
| WO | 2011036272 A2 | 3/2011 |
| WO | 2011038081 | 3/2011 |
| WO | 2011076637 | 6/2011 |
| WO | 2012020106 | 2/2012 |
| WO | 2012025584 | 3/2012 |
| WO | 2012044730 | 4/2012 |
| WO | 2012055797 | 5/2012 |
| WO | 2012099682 | 7/2012 |
| WO | 2012174422 | 12/2012 |
| WO | 2012174567 | 12/2012 |
| WO | 2012174568 | 12/2012 |
| WO | 2013032552 | 3/2013 |
| WO | 2013101301 | 7/2013 |

OTHER PUBLICATIONS

Notice of Allowance dated Jan. 29, 2016 for U.S. Appl. No. 14/755,546.
English translation of First Office Action for Taiwanese Application No. 101121656, Nov. 13, 2015.
Singapore Notice of Eligibility for Grant, Search Report, and Examination Report transmitted Dec. 10, 2015 for Singapore Application No. 11201503336V.
Office Action dated Jan. 11, 2016 for U.S. Appl. No. 14/161,328.
English Summary of Russian Office Action for Application Serial No. 2014111340, dated Feb. 25, 2016, 8 pages.
United Kingdom Examination Report for Patent Application No. GB1400762.9 dated Feb. 11, 2016.
Office Action dated Feb. 16, 2016 for U.S. Appl. No. 14/108,142.
Extended European Search Report for European Application No. 13849152.7-1303 / 2912142 PCT/US2013/066811, dated Feb. 12, 2016.
English summary of Spanish Office Action for Application Serial No. P201490025, Feb. 9, 2016, 8 pages.
Supplemental European Search Report for European Application No. 12727994.1-1302, dated Feb. 17, 2016.
International Search Report and Written Opinion dated Oct. 18, 2013, relating to International Application No. PCT/US2013/053935.
International Preliminary Report on Patentability dated Feb. 16, 2016, relating to International Application No. PCT/US2014/051508.
English Summary of Chinese Office Action for Application Serial No. 201380041896.1, dated Mar. 21, 7 pages.
Extended European Search Report for European Application No. 13827981.5-1708 / 2888092 PCT/US2013/053935, dated Feb. 19, 2016.
Australian First Patent Examination Report for Application No. 2012271047, dated Feb. 29, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts , Advanced Plastics Processing Lecture, Lecture 11: Foam Processes, Slide 4 (Nov. 11, 2012) (2 pages).

(56) References Cited

OTHER PUBLICATIONS

Australian Second Patent Examination Report for Application No. 2012302251, dated Feb. 26, 2016.
English summary of Chinese Office Action for Chinese Application Serial No. 201380065781.6, Apr. 19, 2016, 14 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daployhmspp-extruded-foam/).
Reichelt et al., "PP-Blends with Tailored Foamability and Mechanical Properties", Cellular Polymers, vol. 22, No. 5, 2003, 14 pages.
Ratzsch et al., "Radical reactions on polypropylene in the solid state", Prog. Polym. Sci. 27 (2002) 1195-1282, 88 pages.
Excerpts from Encyclopedia of Polymer Science and Technology: Plastics, Resins, Rubbers, and Fibers, "Blowing Agents", vol. 2, John Wiley & Sons, Inc. (1965), 37 pages.
Excerpts from Polymer Foams: Science and Technology, Lee et al., "Introduction to Polymeric Foams", CRC Press (2007) 51 pages.
"Daploy(TM) HMS Polypropylene for Foam Extrusion", obtained from Borealis webpage obtained from the Internet Archive\s "Wayback Machine" as of Nov. 16, 2008 https://web.archive.org/web/20081116085125/http://www.borealisgroup.com/pdf/literature/borealisborouge/brochure/K_IN0020_GB_FF_2007_10_BB.pdf).
Excerpts from Gibson and Ashby, Cellular solids: Structure and properties—Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
ASTM D3763-86, an American Society for Testing of Materials (ASTM), "Standard Method for High-Speed Puncture Properties of Plastics Using Load and Displacement Sensors" (1986 Edition), 5 pages.
ASTM D1922-93, an American Society for Testing of Materials (ASTM), "Standard Method for Propagation Tear Resistance of Plastic Film and Thin Sheeting by Pendulum Method" (1993 Edition), 5 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., "Applicability of the Transient Plane Source Method to Measure the Thermal Conductivity of Low-Density Polyethylene Foams", Journal of Polymer Science: Part B: Polymer Physics, vol. 42 (2004), 1226-1234.
The Burn Foundation, "Scald Burns", available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
"Power of a Microwave Oven", available at https://web.archive.org/web/20071010183358/http://hypertextbook.com/facts/2007/TatyanaNektalova.shtml, dated Oct. 10, 2007, accessed on Feb. 5, 2016.
Health Physics Society, "Microwave Oven Q & A", available at https://web.archive.org/web/20090302090144/http://www.hps.org/publicinformation/ate/faqs/microwaveoveng&a.html, dated Mar. 2, 2009, accessed on Feb. 5,2016.
Cook's Info, "Microwave Ovens", available at http://www.cooksinfo.com/microwave-ovens, accessed on Feb. 5, 2016.

Antunes et al., "Heat Transfer in Polypropylene-Based Foams ProducedUsing Different Foaming Processes", Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry\s Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
Borealis Product Brochure, Daploy HMS Polypropylene for Foam Extrusion (2010), 20 pages.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
M. Antunes et al., "Heat Transfer in Polyolefin Foams," Heat Transfer in Multi-Phase Materials, A. Öchsner and G. E. Murch, Eds. Springer-Verlag Berlin Heidelberg, 2011, 131-161.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, Apr. 27, 2016, 5 pages.
Japanese Office Action for Japanese Patent Application No. 2014-528384, dated Mar. 1, 2016.
International Preliminary Report on Patentability dated Feb. 16, 2016, relating to International Application No. PCT/US2014/051508. E
English Summary of Chinese Office Action for Application Serial No. 201380041896.1, dated Mar. 18, 2016, 7 pages.
Doerpinghaus et al., "Separating the effects of sparse long-chain branching on rheology from those due to molecular weight in polyethylenes", Journal of Rheology, 47, 717 (2003).
English Summary of Chinese Office Action for Application Serial No. 201280051426.9, Apr. 29, 2016, 5 pages.
English translation of Japanese Office Action for Japanese Application No. 2014-516089, dated May 10, 2016.
Third Party Submission Under 37 CFR 1.290 filed on May 12, 2016 in U.S. Appl. No. 14/739,510.
Daploy HMS Polypropylene for Foam Extrusion, 20 pages, BOREALIS Borouge Shaping the Future with Plastics, Published 2010, www.borealisgroup.com, www.borouge.com, Vienna, Austria.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).

(56) References Cited

OTHER PUBLICATIONS

Bc. Lukas Kovar, High Pressure Crystallization of Long Chain Branched Polypropylene, Master Thesis, Thomas Bata University in Zlin, 2010 (83 pages).
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written Opinion dated May 27, 2016 for Singapore Application No. 11201504327V.
Office Action dated Jun. 10, 2016 for U.S. Appl. No. 14/188,504.
Office Action dated Mar. 10, 2016 for U.S. Appl. No. 14/620,073.
Notice of Acceptance dated Jun. 10, 2016 for Australian Application No. 2012302251.
Office Action for Chinese Patent Application No. 201380065116.7, dated Jun. 28, 2016, including English language summary, 12 pages.
Australian First Patent Examination Report for Application No. 2013334155, dated May 23, 2016, 4 pages.
Extended European Search Report for European Application No. 13862331.9-1708 / 2931627 PCT/US2013/074923, dated Jul. 7, 2016.
English translation of Russian Office Action for Application Serial No. 2014101298, dated Jul. 22, 2016, 7 pages.
Office Action dated Sep. 1, 2016 for U.S. Appl. No. 14/106,212.
Australian First Patent Examination Report for Application No. 2013359097 sent Aug. 26, 2016, 3 pages.
British Examamination Report for GB Application No. GB1400762.9, sent on Aug. 8, 2016, 2 pages.
Extended European Search Report for European Application No. 13863546.1 established Jul. 12, 2016, 7 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapre Written Opinion for Singapore Patent Application No. 11201504756T established Jul. 19, 2016, 7 pages.
Office Action dated Sep. 27, 2016 for U.S. Appl. No. 14/725,319.
Taiwan Office Action for Taiwan Pat. App. No. 102146299 received on Oct. 21, 2016, 7 pages.
Third Party Observation filed in European Patent App. No. 12727994.1 received on Nov. 4, 2016, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4 received Oct. 12, 2016, 4 pages.
British Examination Report for GB App. No. 1400762.9 received Oct. 12, 2016, 2 pages.
Chinese Office Action for Chinese Applicaiton 201380065781.6 received Oct. 18, 2016, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009.
Extended European Search Report for European App. No. 13863649.3 received Sep. 27, 2016, 9 pages.
Office Action dated Nov. 4, 2016 for U.S. Appl. No. 13/961,411.
Chinese Office Action for Chinese Application No. 201280051426.9 received Nov. 1, 9 pages.
English Summary of Chinese Office Action for Application Serial No. 201380041896.1, dated Nov. 11, 2016, 11 pages.
Extended European Search Report for European App. No. 14775300.8 sent Oct. 24, 2016, 9 pages.
Office Action dated Nov. 18, 2016 for U.S. Appl. No. 14/718,836.
Borealis AG, Daploy(TM) HMS Polypropylene for Foam Extrusion, 2010, 20 pages.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jul. 3, 2014, relating to International Application No. PCT/US2014/025697.
International Search Report and Written Opinion dated Sep. 17, 2013, relating to International Application No. PCT/US2012/041395.
International Search Report dated Feb. 26, 2013, relating to International Application No. PCT/US2012/043018.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 29, 2013, relating to International Application No. PCT/US2012/043016, 25 pages.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of JP 2006-130814.
Notice of Allowance dated Jun. 23, 2014 for U.S. Appl. No. 13/491,327.
Notice of Allowance dated Oct. 6, 2014 for U.S. Appl. No. 13/491,327.
Office action dated Apr. 11, 2014 for U.S. Appl. No. 13/526,417.
Office Action dated Aug. 19, 2014 for Chinese Application No. 201280035667.4.
Office Action dated Aug. 21, 2014 for U.S. Appl. No. 13/526,454.
Office Action dated Jul. 25, 2014 for U.S. Appl. No. 13/525,640.
Office Action dated Oct. 10, 2014 for U.S. Appl. No. 14/106,358.
Office Action dated Oct. 16, 2014 for U.S. Appl. No. 14/106,212.
Office Action dated Sep. 25, 2014 for U.S. Appl. No. 13/526,417.
Inter Partes Review Petition for U.S. Pat. No. 8,883,280 (712 pages) [Reference submitted in three parts].
Borealis webpage dated Jan. 20, 2010 from Internet Archive (6 pages).
Gibson and Ashby, Cellular solids: structure and properties, 2nd ed., Cambridge University Press (1997) (7 pages).
C. Maier and T. Calafut, Polypropylene: the Definitive User\s Guide and Databook, Plastics Design Library, William Andrew Inc. (1998) (19 pages).
Reichelt et al., Cellular Polymers, vol. 22, No. 5 (2003) (14 pages).
Ratzsch et al., Prog. Polym. Sci., 27 (2002), 1195-1282 (88 pages).
Encyclopedia of Polymer Science and Technology: Plastics, Resins, Rubbers, and Fibers, vol. 2, John Wiley & Sons, Inc. (1965) (37 pages).
Shau-Tarng Lee, Chul B. Park, and N.S. Ramesh, Polymer Foams: Science and Technology, CRC Press (2007) (51 pages).
Grant & Hackh\s Chemical Dictionary, 5th ed., McGraw-Hill, Inc. (1987) (3 pages).
Merriam-Webster\s Collegiate Dictionary, 11th ed. (2003), p. 70 (3 pages).

(56) References Cited

OTHER PUBLICATIONS

Merriam-Webster\s Collegiate Dictionary, 11th ed. (2003), p. 1237 (3 pages).
Hawley\s Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournals.com/journals.asp?Page=111 &JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly HMS Polypropylene for Foam Extrusion" obtained from Borealis webpage obtained from the Internet Archive\s "Wayback Machine" as of Nov. 16, 2008 (https://web.archive.org/web/20081116085125/http://www.borealisgroup.com/pdf/literature/borealis-borouge/brochure/K_IN0020_GB_FF_2007_10_BB.pdf) ("Brochure \08" ) (20 pages).
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Jan. 19, 2015, relating to International Application No. PCT/US2014/059312.
International Search Report dated Jan. 19, 2015, relating to International Application No. PCT/US2014/059216.
International Search Report dated Nov. 7, 2014, relating to International Application No. PCT/US2014/51508.
Machine English translation of EP0086869.
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.
New Zealand First Examination Report for Application No. 621219 dated Nov. 17, 2014.
Notice of Allowance dated Apr. 6, 2015 for U.S. Appl. No. 13/526,417.
Office Action dated Apr. 10, 2015 for U.S. Appl. No. 14/106,358.
Office Action dated Apr. 14, 2015 for U.S. Appl. No. 14/106,212.
Office Action dated Apr. 30, 2015 for U.S. Appl. No. 14/462,073.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jun. 23, 2015 for U.S. Appl. No. 13/525,640.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. No. 14/188,504 submitted May 11, 2015 and May 27, 2015 (43 pages).
Wang et al., "Extending PP\s Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Certified English translation of JP2003292663.
Office Action Chinese Patent Application No. 201280051426.9 dated Jul. 23, 2015.
Office Action dated Aug. 18, 2015 for U.S. Appl. No. 14/106,212.
Office Action dated Aug. 27, 2015 for U.S. Appl. No. 14/106,358.
Office Action dated May 19, 2015 for Chinese Application No. 201280035667.4.
Office Action dated Oct. 27, 2015 for U.S. Appl. No. 14/462,073.
Office Action dated Oct. 8, 2015 for U.S. Appl. No. 14/188,504.
Second Chinese Office Action dated Sep. 6, 2015 for Chinese Application Serial No. 201280034350.9.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
English translation of Russian Office Action for Application Serial No. 2015127677, dated Sep. 16, 2015.
Japanese Office Action for Japanese App. No. 2014-528384 received Dec. 6, 2016, 15 pages.
Singapore Office Action and Written Opinion received Feb. 6, 2017 for Singapore Application No 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 sent Jan. 30, 2017, 3 pages.
Singapore Office Action and Written Opinion dated Feb. 14, 2017 for Singapore Application No. 11201504327V, 6 pages.
Spanish Search Report for Spanish App. No. 201490025 received Dec. 23, 2016, 5 pages.
Japanese Office Action for Japanese Patent App. 2014-516089 sent Dec. 20, 2016, 6 pages.
European Examination Report for European App. No. 12727994.1 received on Jan. 25, 2016, 4 pages.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Gulf Cooperation Council Examination Report for GCC Patent App. No. GC2012-21529 received on Nov. 14, 2016, 6 pages.
Chinese Office Action for Chinese App. No. 201480052411.3 dated Feb. 28, 2017, 16 pages.
New Zealand First Examination Report for New Zealand Application 708546 dated Feb. 23, 2014, 2 pages.
Singapore Office Action and Written Opinion dated Dec. 13, 2016 and received on Feb. 28, 2017 for Singapore Application No. 11201504333Y, 6 pages.
Office Action for Chinese Patent Application No. 201380065116.7, dated Mar. 1, 2017, 9 pages.
Chinese Office Action dated Mar. 10, 2017 for Chinese Patent Application 201480007369.3, 11 pages.
New Zealand Examination Report for New Zealand Application No. 708463 dated Mar. 16, 2017, 3 pages.
Supplemental European Search Report for European App. No. 14836418 dated Feb. 23, 2017, 6 pages.
New Zealand Examination Report for New Zealand Application No. 708552 received on Mar. 29, 2017, 2 pages.
Australian Search Report for Australian App. No. 2013359028, dated Apr. 10, 2017, 5 pages.
Australian Search Report for Australian App. No. 20133358988 dated Apr. 11, 2017, 4 pages.

CELLULAR POLYMERIC MATERIAL

PRIORITY CLAIM

This application claims priority under 35 U.S.C. §119(e) to U.S. Provisional Application Ser. No. 62/052,296, filed Sep. 18, 2014, which is expressly incorporated by reference herein.

BACKGROUND

The present disclosure relates to polymeric materials that may be formed to produce a container, in particular polymeric materials that insulate. More particularly, the present disclosure relates to morphology and crystalline structure of cellular polymeric material that may be transformed into usable articles, such as insulated containers.

SUMMARY

An insulated container in accordance with the present disclosure, which may be a drink cup or a food-storage cup (e.g.), is manufactured from a sheet extrudate or tubular extrudate produced in an extrusion process. In illustrative embodiments, the extrudate is a cellular polymeric material.

In illustrative embodiments, an insulative container in accordance with the present disclosure is manufactured from a tubular extrudate produced in an extrusion process. In illustrative embodiments, the extrudate is an insulative cellular polypropylene-based material configured to crease and/or wrinkle during cup convolution or shaping.

In illustrative embodiments, the cell morphology of an extruded sheet of insulative cellular polypropylene-based material in accordance with the present disclosure is a function of the extrusion angle, which has an effect on the quality of an article, such as an insulative container, formed therewith. In particular, cell morphology is affected by the angle at which a polypropylene-based material in accordance with the present disclosure exits an enclosed die volume through extruder die lips, and is related to deep creasing and/or wrinkling in the formed article.

In illustrative embodiments, the cell morphology of an extruded sheet of insulative cellular polypropylene-based material in accordance with the present disclosure is a function of formulation and process conditions, which conditions have an effect on the quality of an article, such as an insulative container, formed therewith. In particular, the effects of such conditions on cell density and cell dimensional attributes, and ultimately on creasing/wrinkling, results in a wrinkle prediction model based on power law regression.

In illustrative embodiments, the cell aspect ratio of insulative cellular polypropylene-based material in accordance with the present disclosure has an effect on the wrinkling of that material during mechanical convolution. Parameters such as cell density and aspect ratio ultimately determine control limits that result in a wrinkling model for a mechanically convoluted container.

In illustrative embodiments, the circumferential direction cell aspect ratio of an extruded sheet of insulative cellular polypropylene-based material in accordance with the present disclosure has a greater effect than the cell aspect ratio in the axial direction on the wrinkling of that material during mechanical convolution.

In illustrative embodiments, the orientation of an extruded sheet of insulative cellular polypropylene-based material in accordance with the present disclosure has an effect on the wrinkling of that material during mechanical convolution. In particular, when formed into a circular article, the sheet may be oriented such that the circumference of the circular article represents −45° to +45° perpendicular to the direction of flow for the material of the sheet. The effects of parameters such as sheet orientation in formed circular articles affect the cell morphology of articles, and the cell morphology of the articles ultimately influence their tendency to wrinkle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of an insulative cup in accordance with the present disclosure showing that the insulative cup includes a side wall and a floor coupled to the sidewall to define an interior region formed in the insulative cup and that the side wall of the cup extends around the interior region in a circumferential direction (along the circumference of the side wall) and between a brim included in the insulative cup and the floor in an axial directions (up and down);

FIG. 2 is an enlarged view of an axial portion of an insulative cup from the circled region of FIG. 1 showing that the insulative cup is made from an insulative sheet including an outer skin made from a polymeric film and a strip of insulative cellular non-aromatic polymeric material;

FIG. 3 is a diagrammatic and perspective view of a material-forming process in accordance with the present disclosure showing that the material-forming process includes, from left to right, a formulation of insulative cellular non-aromatic polymeric material being placed into a hopper that is fed into a first extrusion zone of a first extruder where heat and pressure are applied to form molten resin and showing that a blowing agent is injected into the molten resin to form an extrusion resin mixture that is fed into a second extrusion zone of a second extruder where the extrusion resin mixture exits and expands to form an extrudate which is slit to form a strip of insulative cellular non-aromatic polymeric material and suggesting that a sidewall blank (in phantom) is oriented on the strip to cause an eventual circumference of an insulative cup formed using the side-wall blank to be oriented perpendicular to the direction of extrusion;

Figure 24:
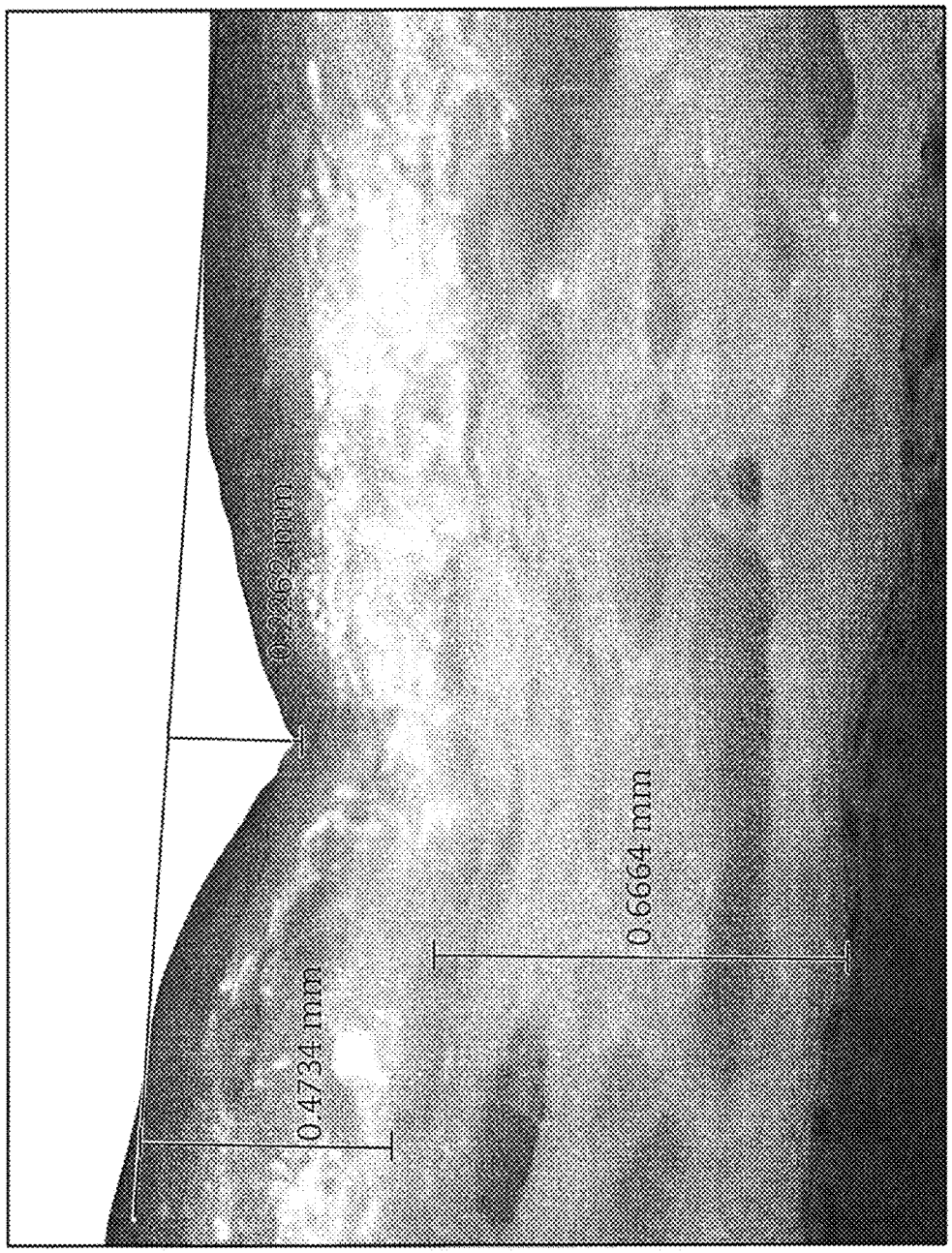
Figure 25:
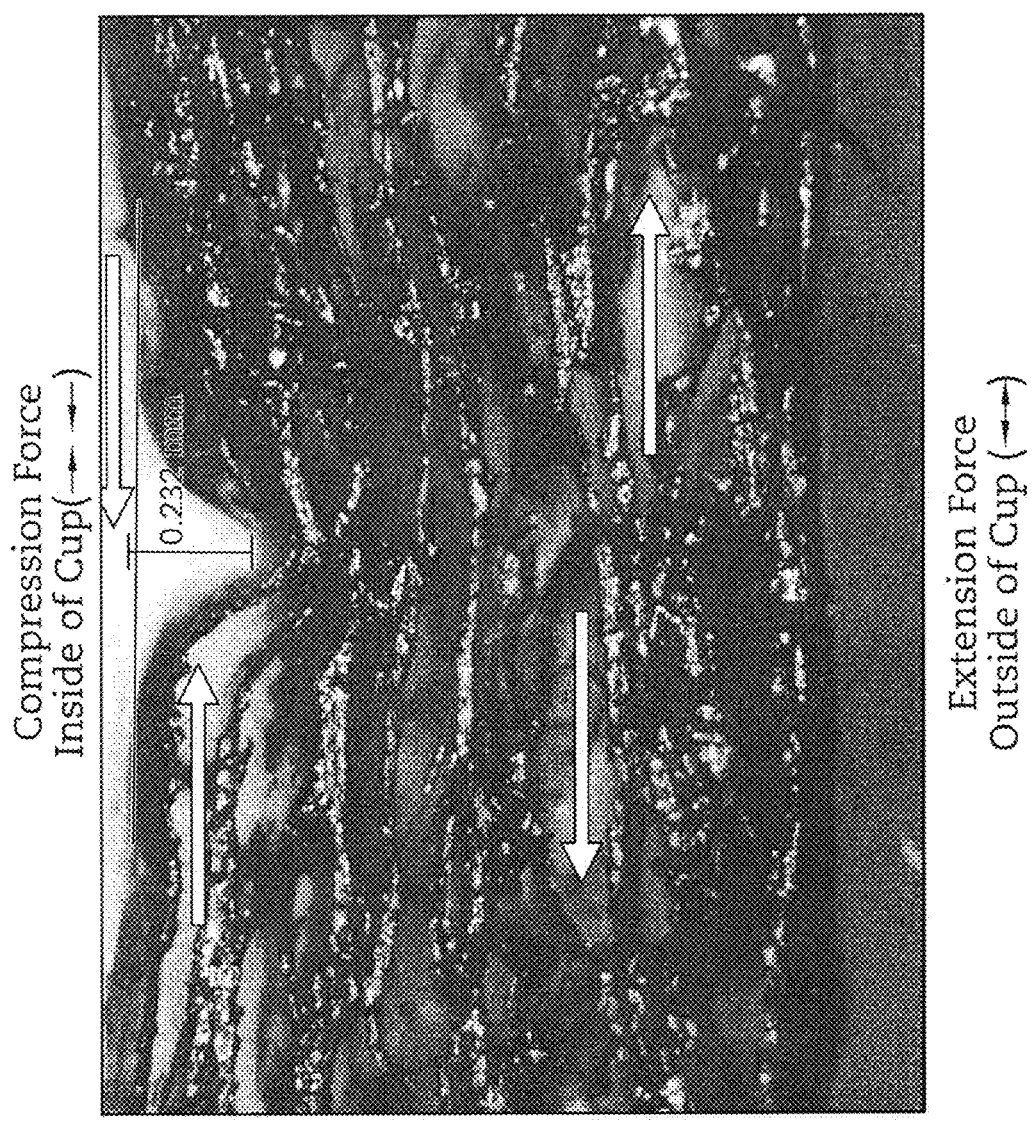

FIG. 24 shows a View A microscopy image of the insulative cup side wall from the cup of Example 5 (with printed film laminated to the foam), where OET is outside of the insulative cup, illustrating that the insulative cup side wall collapsed in compression during cup formation leading to crease formation with crease depth of 0.23 mm; and FIG. 25 shows a View A microscopy image of the insulative cup side wall from an insulative cup that is without a laminated printed film and that a black marker was used to eliminate light reflection for a clearer image, where OET is outside of the insulative cup, again illustrating that creasing/deep wrinkles formed on the inside of the insulative cup in the same way as in FIG. 24.

DETAILED DESCRIPTION

One feature of of an extruded sheet of insulative cellular polypropylene-based material in accordance with the present disclosure is the ability of the sheet to form a surface with noticeable creases and wrinkles when curved to form a round article, such as an insulative cup. The surface may be wrinkled inside the cup, where compression forces may cause material to crush and/or crease easily, especially for low density material with a large cell aspect ratio. In exemplary embodiments, the surface profile of a cup made from an extruded sheet of insulative cellular polypropylene-based material as detected by microscopy is such that there is at least one indentation (i.e., creases and/or wrinkles) that is about 5 microns or more naturally occurring in the outside and/or inside of the cup surface when it is subject to extension and compression forces during cup forming. In one exemplary embodiment, the surface profile may include indentations of about 50 microns or more. In another exemplary embodiment, the surface profile may include indentations of about 100 microns or more. At a depth of about 10 microns and less, micro-wrinkles and/or creases on a cup surface are ordinarily not visible to the naked eye.

In one exemplary embodiment, an insulative cup formed from a sheet comprising a skin and a strip of insulative cellular polypropylene-based material in accordance with the present disclosure had typical creases (i.e., deep wrinkles) about 200 microns deep extending from the top of the cup to the bottom of the cup. In another exemplary embodiment, an insulative cup formed from a sheet comprising a strip of insulative cellular polypropylene-based material only (without a skin) in accordance with the present disclosure had typical creases about 200 microns deep extending from the top of the cup to the bottom of the cup.

Such creases with depths from about 100 microns to about 500 microns are typically formed inside of a cup undergoing compression. Creases may form in instances where sheets include a skin or exclude a skin.

It was unexpectedly found that the cell morphology of an extruded sheet of insulative cellular polypropylene-based material in accordance with the present disclosure has an effect on the quality of the formed article, such as an insulative cup. The effects of cell morphology on a tendency of insulative cellular polypropylene-based material to wrinkle during convolution may be illustrated through examining the effect of varying the angle of the extruder die lips. In exemplary embodiments, the angle at which insulative cellular polypropylene-based material in accordance with the present disclosure exits an enclosed volume may affect the material's tendency to wrinkle. It was found that for a specified formulation of insulative cellular polypropylene-based material and specified cup forming conditions, different die exit angles lead to noticeably different levels of creasing and/or wrinkling in article surfaces during extruded sheet convolution. The two geometric exit angles selected for examination in the present disclosure are those commonly used in polyethylene foam production, i.e., an exit angle of 90°, and in polystyrene foam production, i.e., an exit angle of 44° (see, Example 1).

In exemplary embodiments, insulative cellular polypropylene-based material in accordance with the present disclosure may be extruded as sheet. Microscopy images show that distinct cell morphology exists, i.e., cell structure distinctions, within insulative cups made from such extruded sheets when one sheet is produced with a higher curvature die exit angle and the other with a lower curvature die exit angle. Insulative cups may be made by cutting the sheets such that the resulting circumference of the insulative cup is aligned to be perpendicular or parallel to the direction the sheets are extruded. The difference in cell morphology between cups cut in the two directions may be detected by examining portions cut from the axial sides of the cups under a microscope.

Direct evidence of polymer cell structure is provided by microscopy studies. There is a close relationship between the regularity of molecular structure and malleability. Cell morphology describes polymer cell density, cell structure, cell wall thickness, cell shape, and cell size distribution of cells. Polymer cell structures may have the same general shape and appearance, being composed predominantly of ovular cells, and the same lognormal cell distribution, but possess a different cell aspect ratio and cell wall thickness. Illustratively, cell aspect ratio is the ratio between lengths of the ovular polymer cells to widths of the ovular polymer cells. Illustratively, cell wall thickness is the solid polymeric distance between individual polymer cells.

In one exemplary embodiment, an extruded sheet of insulative cellular polypropylene-based material in accordance with the present disclosure may exit from an enclosed die volume at an angle of 90°. In another exemplary embodiment, an extruded sheet of insulative cellular polypropylene-based material may exit from an enclosed die volume at an angle of 44°. Illustratively, an extruded sheet of insulative cellular polypropylene-based material may exit from an enclosed die volume at an angle between 44° and 90°. Two such sheets, one produced at an exit angle of 44° and the other at an exit angle of 90°, may be prepared as strips either in the machine direction or in the cross direction and analyzed with digital microscopy. Cell density, cell distribution, cell shape, cell aspect ratio, and cell wall thickness of an extruded sheet may be held constant when extrusion parameters such as recipe, temperature, and cooling rate are the same. In the present disclosure, formation of wrinkled material was found to occur when the exit angle of curvature increased from 44° to 90° (see, Example 1, FIGS. 5-7). Without wishing to be bound by theory, one plausible explanation may be that cell density and dimensional morphology are a function of enclosed die volume exit angle, i.e., cell density and dimensional morphology may be altered upon exit from different enclosed die volume exit angles, thereby creating wrinkled material.

The disclosure herein provides methods of producing an insulative cellular material. In an embodiment, the insulative cellular material is polypropylene based. In an embodiment, the insulative cellular material produces wrinkles and/or creases during mechanical convolution. In an embodiment, a method of producing an insulative cellular material includes extruding a formulation as disclosed herein through an extruder die lips at an exit angle from about 0° to about 60°. In an embodiment, the formulation is extruded through die lips at an angle of about 0° to about 10°, about 10° to about 20°, about 20° to about 30°, about 30° to about 40°, about 40° to about 50°, about 50° to about 60°, about 40° to about 45°, 0° to about 20°, 0° to about 30°, 0° to about 40°, 0° to about 50°, about 10° to about 60°, about 10° to about 50°, about 10° to about 40°, about 10° to about 30°, about 20° to about 60°, about 20° to about 50°, about 20° to about 40°, about 30° to about 60°, about 30° to about 50°, or about 40° to about 60°. An embodiment includes the method wherein the die exit angle may be about 10°, 20°, 30°, 40°, 41°, 42°, 43°, 44°, 45°, 46°, 47°, 48°, 49°, 50°, or 60°.

In an embodiment of a method of producing an insulative cellular material, wherein the formulation comprises i) a first polymer material comprising at least one high melt strength polypropylene homopolymer, and ii) a second polymer material comprising at least one polymer selected from the group consisting of crystalline polypropylene homopolymer, impact polypropylene copolymer, and mixtures thereof. In an embodiment, the formulation further comprises at least one nucleating agent. In an embodiment, the formulation further comprises at least one slip agent. In an embodiment of a method of producing an insulative cellular material, cell dimensional attributes are according to $y=Ax^K$, wherein either x or y is cell density of the insulative cellular polypropylene-based material and the non-cell density variable is cell length, cell width, or cell wall thickness of the insulative cellular polypropylene-based material.

It was unexpectedly found that cell morphology, especially cell density, of an extruded sheet of insulative cellular polypropylene-based material in accordance with the present disclosure has an effect on the quality of the formed article, such as a cup, formed therewith. The effects of cell density and dimensional attributes on wrinkling in insulative cellular polypropylene-based material may be illustrated through examining cell morphology data from different formulations and process conditions, thus creating a wrinkling prediction model based on power law regression.

In exemplary embodiments, the cell density of insulative cellular polypropylene-based material in accordance with the present disclosure may affect the material's tendency to wrinkle during mechanical convolution. In other exemplary embodiments, the total number of cells of insulative cellular polypropylene-based material may affect the material's tendency to wrinkle during mechanical convolution. In other exemplary embodiments, the cell aspect ratio in the circumferential direction 10 of an insulative cup 12, may affect the material's tendency to wrinkle during mechanical convolution. In other exemplary embodiments, the cell aspect ratio in the axial direction 20 of an insulative cup 12, may affect the material's tendency to wrinkle during mechanical convolution.

Figures 1, 2:
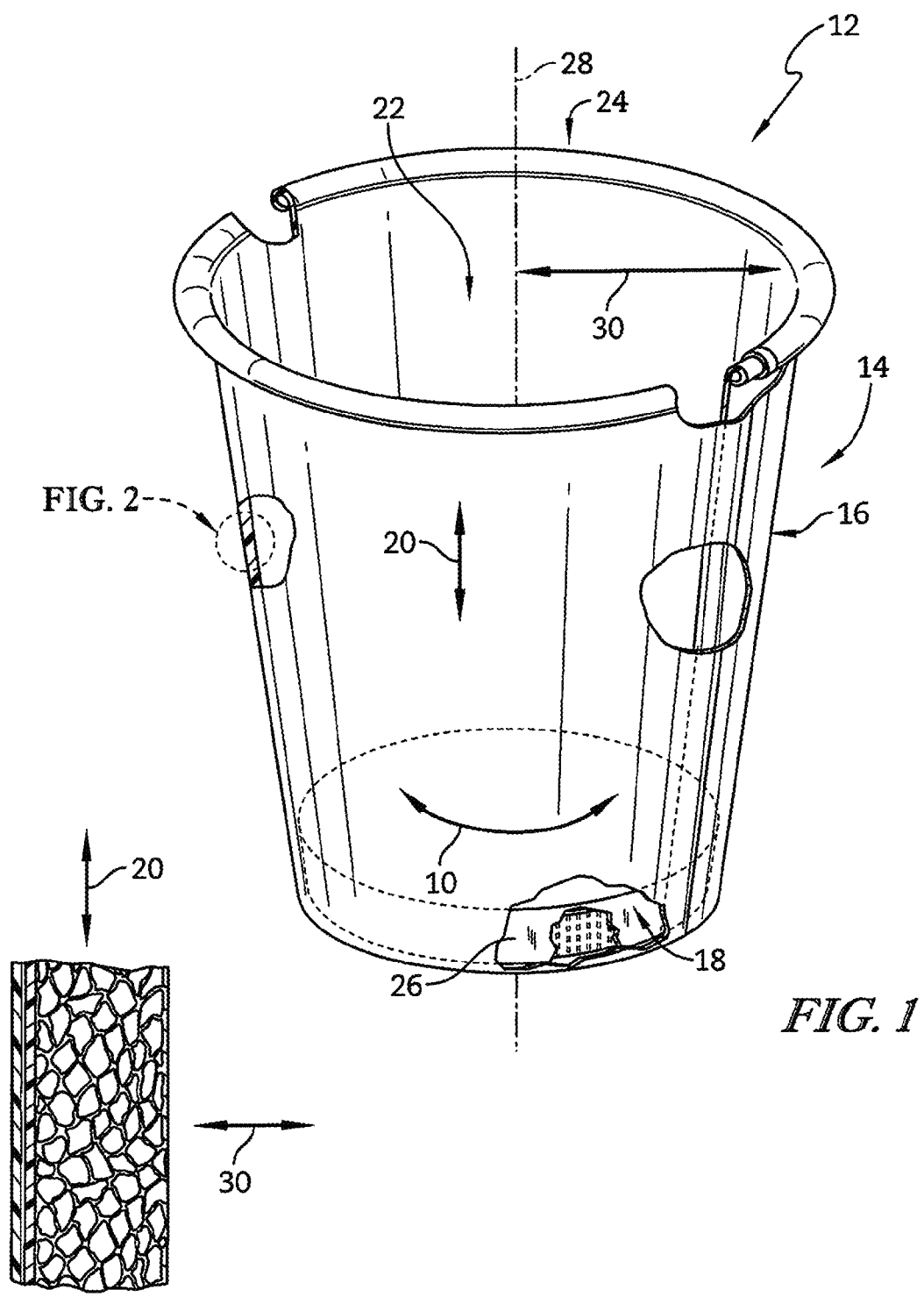

As shown in FIG. 1, insulative cup 12 includes includes a body 14 having a sleeve-shaped side wall 16 and a floor 18 as shown in FIG. 1. Floor 18 is coupled to body 14 and cooperates with side wall 16 to form an interior region 22 therebetween for storing food, liquid, or any suitable product. Body 14 also includes a rolled brim 24 coupled to an upper end of side wall 16 and a floor mount 26 coupled to a lower end of side wall 16 and to floor 18 as shown in FIG. 1. Side wall 16 is arranged to extend around an axis 28 in circumferential direction 10. Side wall 16 is arranged to extend along axis 28 in axial direction 20 as shown in FIGS. 1 and 2. Side wall 16 is spaced apart from axis 28 in a radial direction 30 as shown in FIGS. 1 and 2. U.S. application Ser. No. 13/491,007, filed Jun. 7, 2012 is hereby incorporated by reference in its entirety for disclosure relating to an insulative cup.

Figure 3:
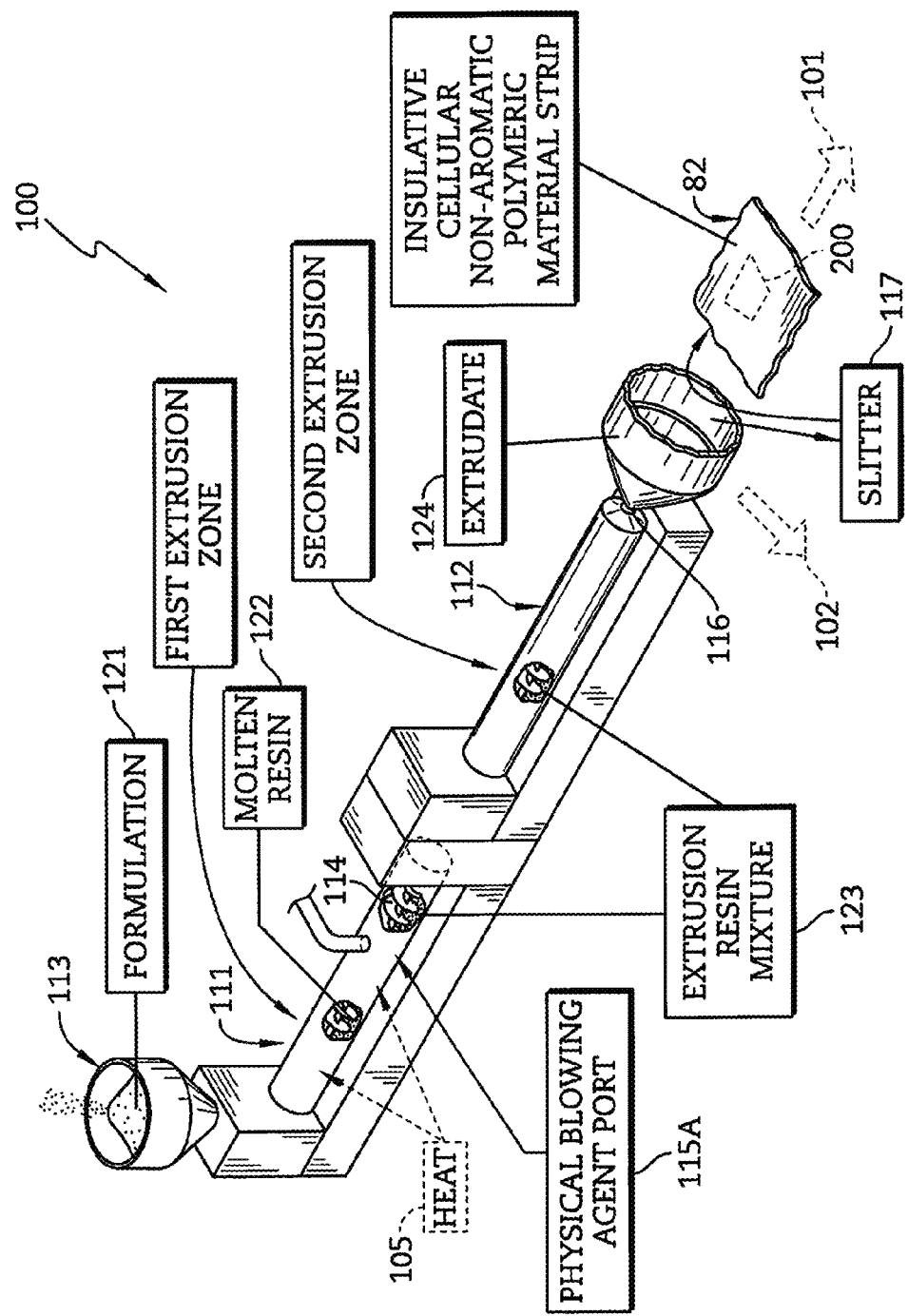

Insulative cup 12 includes a sheet of insulative cellular non-aromatic polymeric material made according to a material-forming process 100 as shown in FIG. 3. Material-forming process 100 begins with a polypropylene-based formulation 121 in accordance with the present disclosure which is used to produce strip 82 of insulative cellular non-aromatic polymeric material as shown in FIG. 3. Formulation 121 is heated and extruded in two stages to produce a tubular extrudate 124 that can be slit to provide strip 82 of insulative cellular non-aromatic polymeric material as illustrated, for example, in FIG. 3. A blowing agent in the form of a liquefied inert gas is introduced into a molten resin 122 in the first extrusion zone. As an example, material-forming process 100 uses a tandem-extrusion technique in which a first extruder 111 and a second extruder 112 cooperate to extrude strip 82 of insulative cellular non-aromatic polymeric material.

As shown in FIG. 3, a formulation 121 of insulative cellular non-aromatic polymeric material is loaded into a hopper 113 that is coupled to first extruder 111. Formulation 121 of insulative cellular non-aromatic polymeric material is moved from hopper 113 by a screw 114 included in first extruder 111. Formulation 121 is transformed into a molten resin 122 in a first extrusion zone of first extruder 111 by application of heat 105 and pressure from screw 114 as suggested in FIG. 3.

In exemplary embodiments, a physical blowing agent may be introduced and mixed into molten resin 122 after molten resin 122 is established. In exemplary embodiments, as discussed further herein, the physical blowing agent may be a gas introduced as a pressurized liquid via a port 115A and mixed with molten resin 122 to form a molten extrusion resin mixture 123 as shown in FIG. 3.

Figure 7:
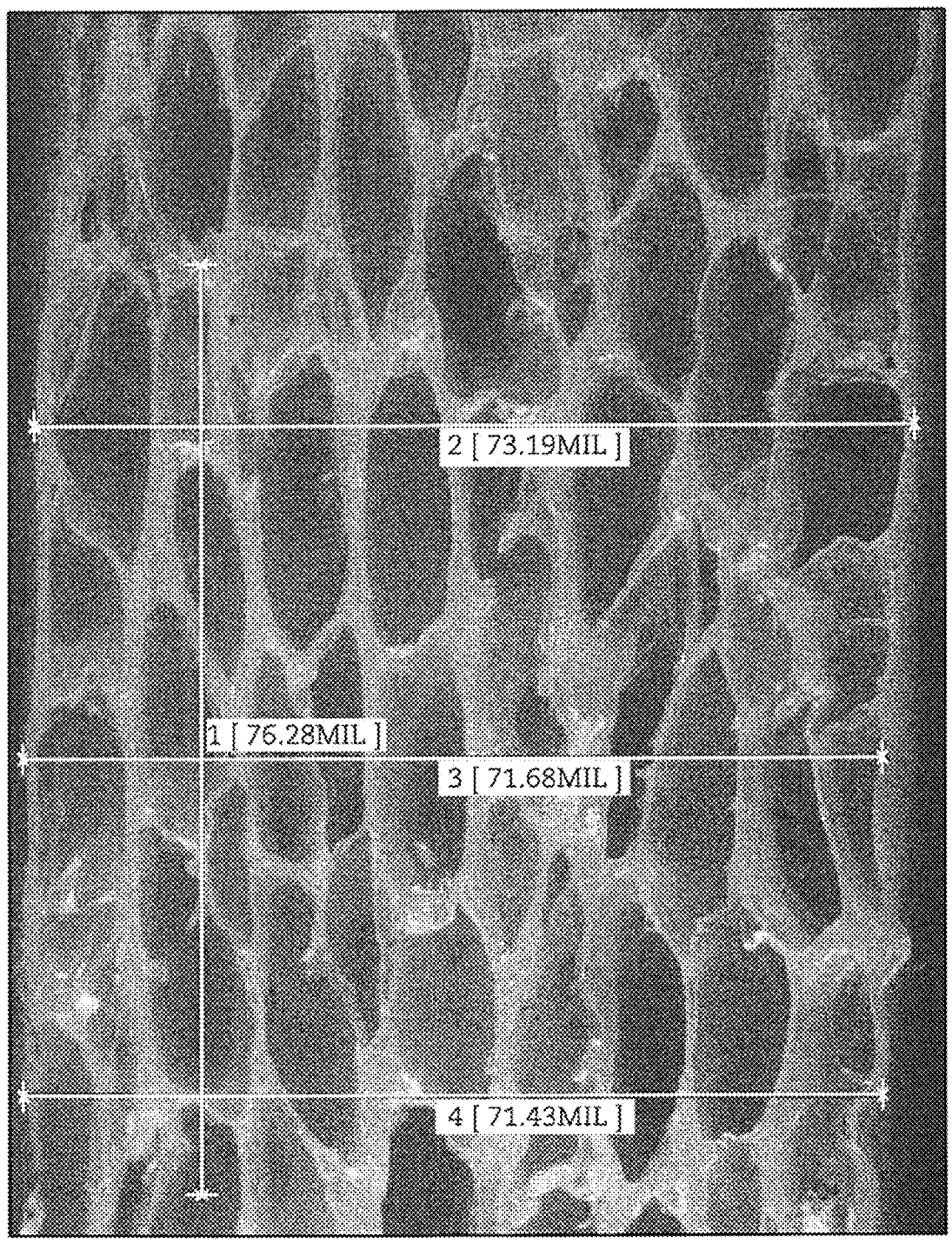
FIG. 7 is a microscopy image of a portion of an insulative cup made from a 90°-extruded sheet strip from an insulative cellular polypropylene-based material of the present disclosure used to quantify dimensional morphology.
Figure 8:
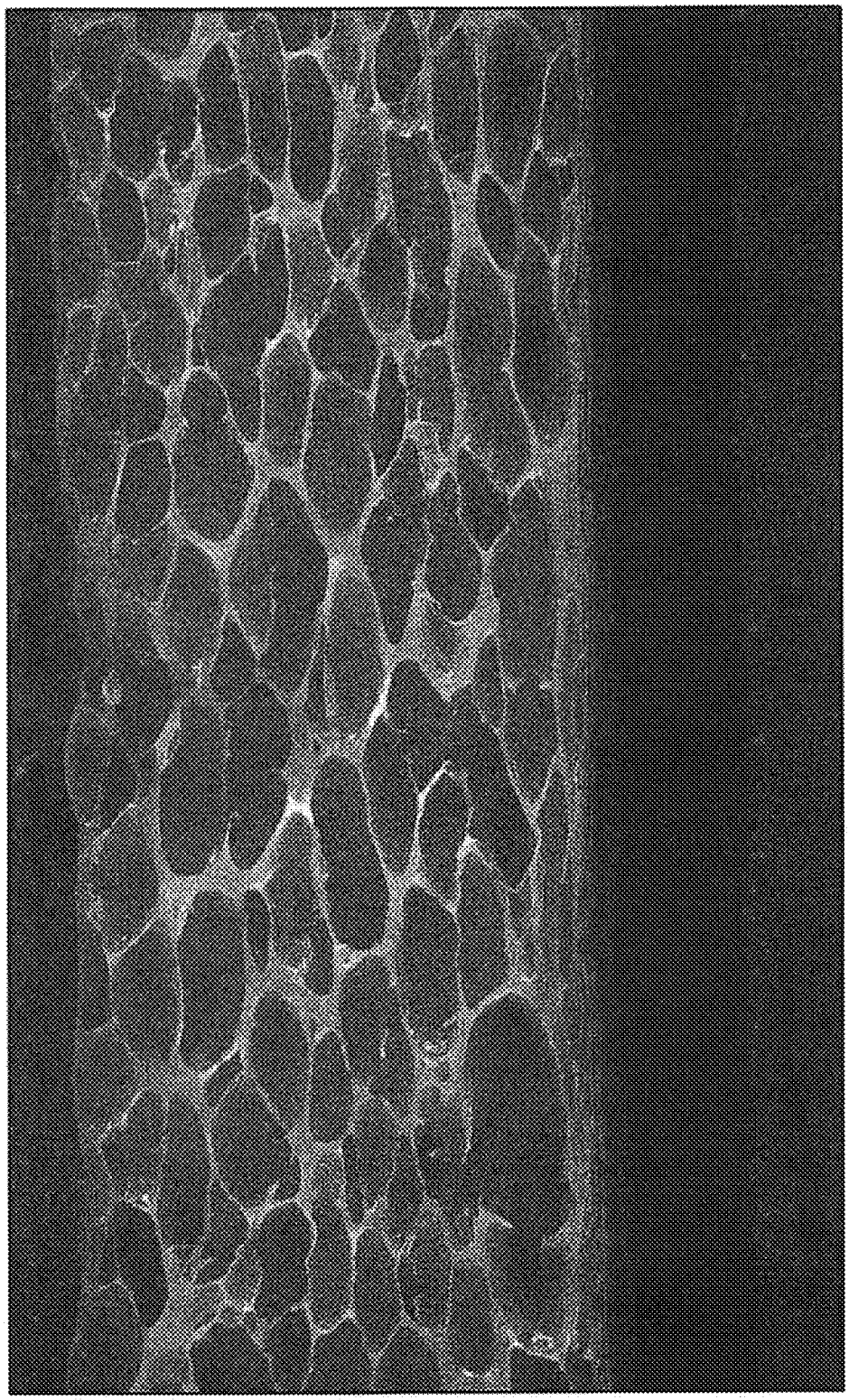
FIG. 8 is an image showing cells with an aspect ratio of about 2.32 and cell density of about 1,216,000 cells/in$^3$, which cells were taken from the axial direction of an insulative cup that did not demonstrate micro-creasing and macro-creasing behavior.
Figure 9:
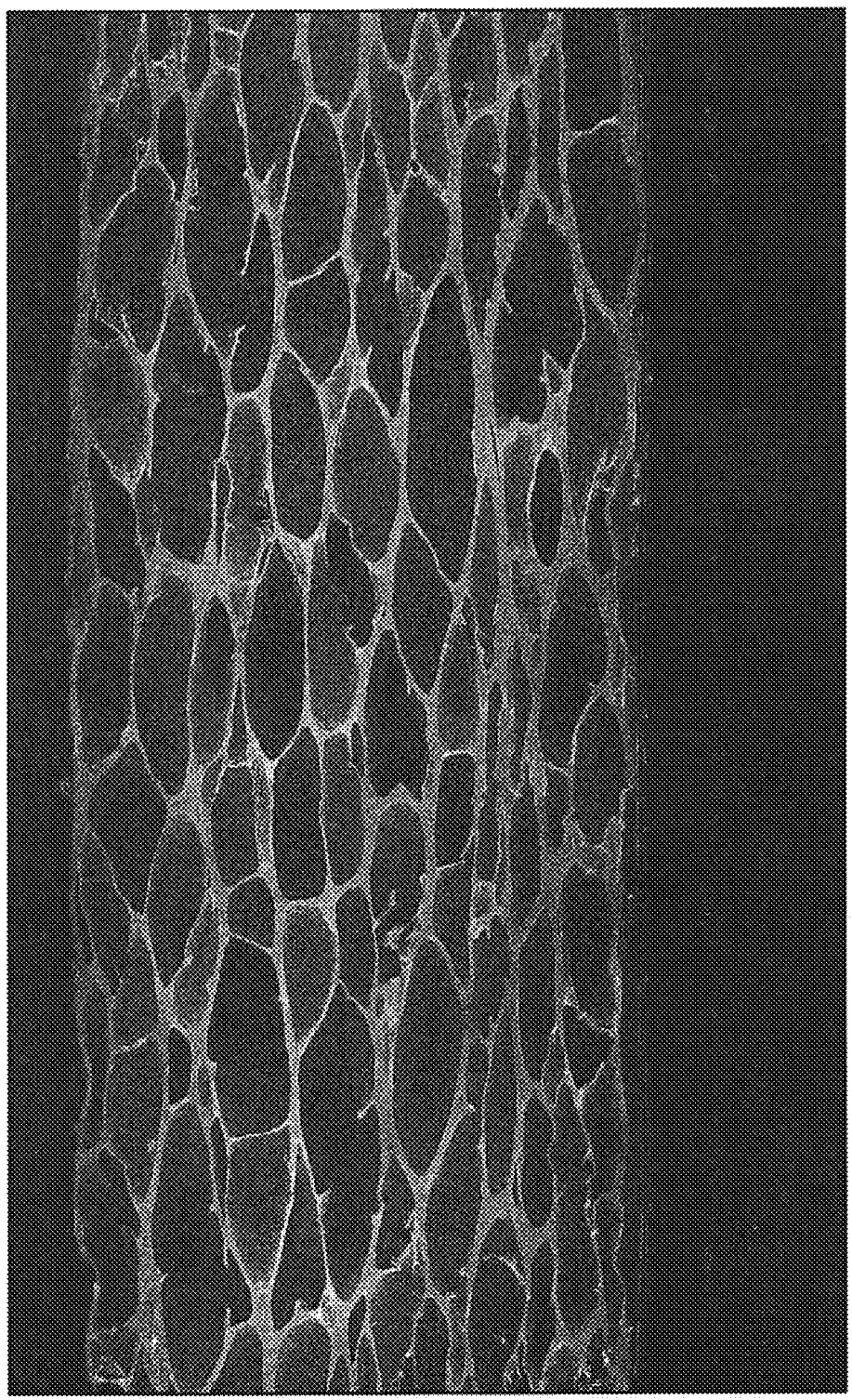
FIG. 9 is an image showing cells with an aspect ratio of about 3.25 and cell density of about 1,159,000 cells/in$^3$, which cells were taken from the axialdirection of an insulative cup that demonstrated micro-creasing and macro-creasing behavior.
Figure 10:
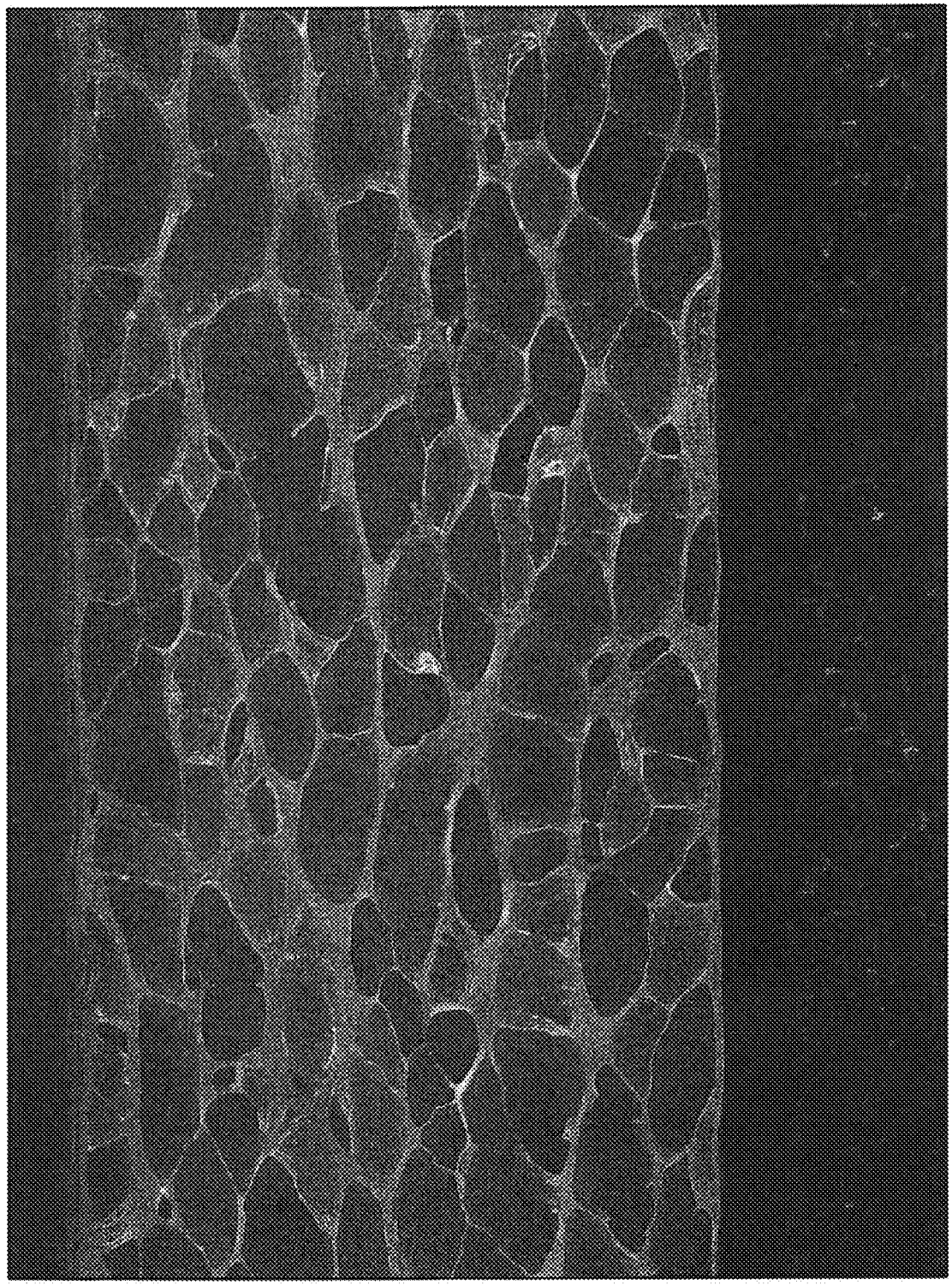
FIG. 10 is an image showing cells with an aspect ratio of about 1.94 and cell density of about 1,631,000 cells/in$^3$, which cells were taken from the circumferential direction of an insulative cup that did not demonstrate micro-creasing and macro-creasing behavior.
Figure 11:
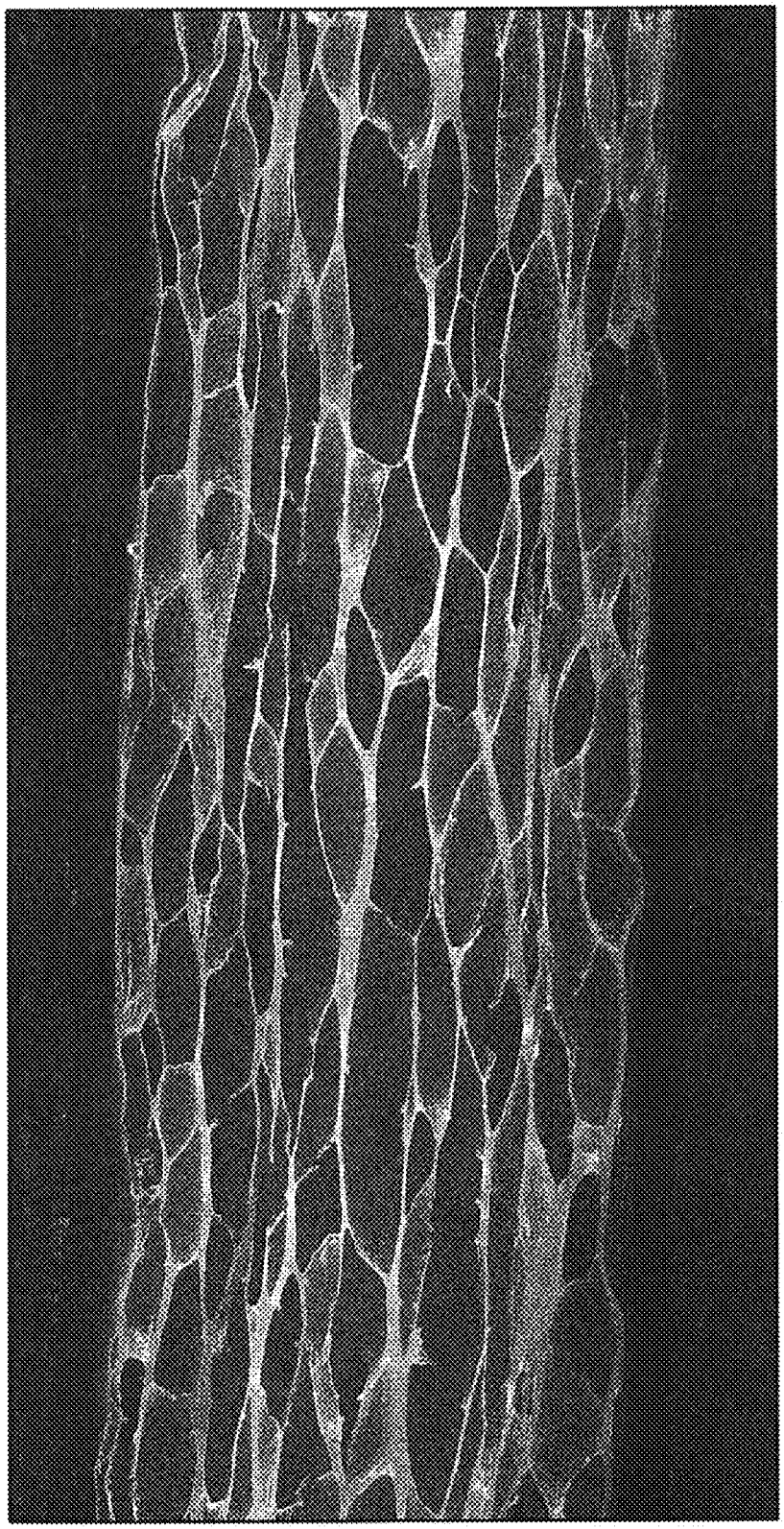
FIG. 11 is an image showing cells with an aspect ratio of about 3.63 and cell density of about 933,000 cells/in$^3$, which cells were taken from the circumferential direction of an insulative cup that demonstrated micro-creasing and macro-creasing behavior.
Figure 12:
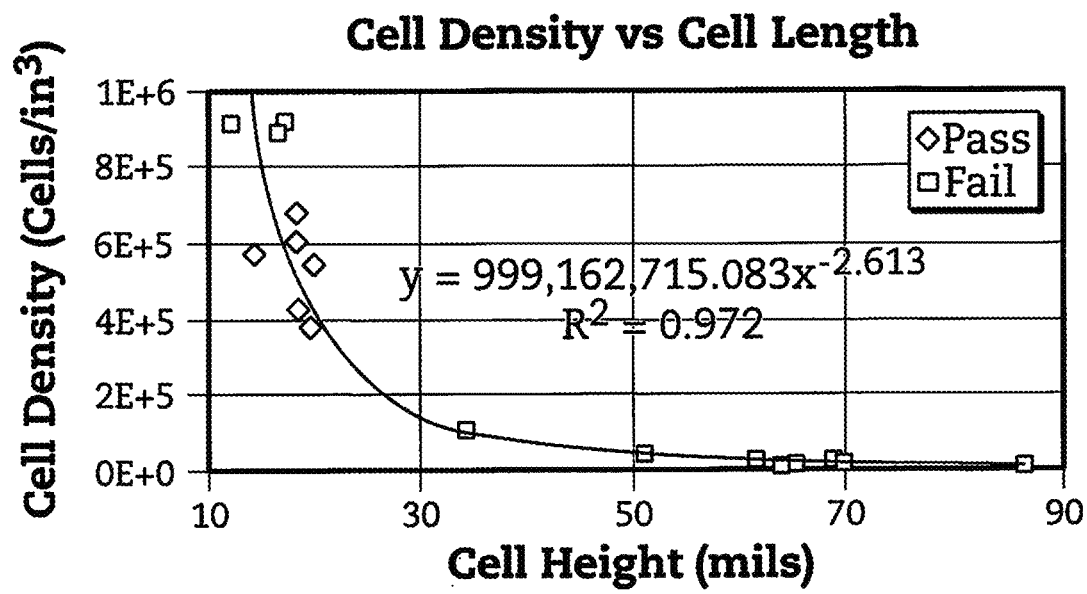
FIG. 12 is a graph with a power law regression fit of cell density vs. cell length in an x-y plot for insulative cups made from insulative cellular polypropylene-based materials of the present disclosure where the power law equation for predicting cell length with respect to cell density is $y=999,162,715.083x^{-2.613}$ and $R^2=0.972$.
Figure 13:
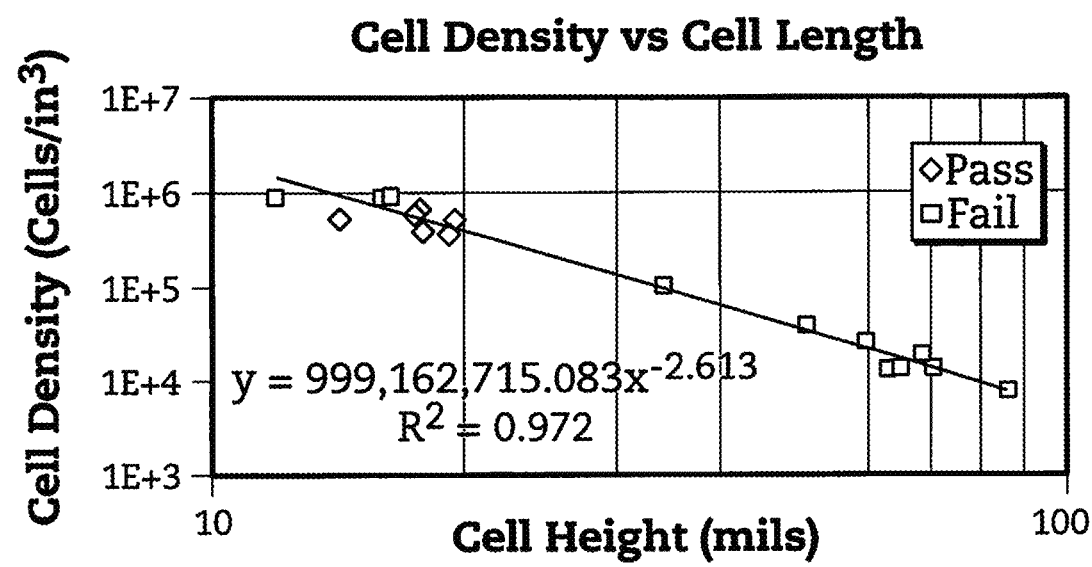
FIG. 13 is a graph with a power law regression fit of cell density vs. cell length in a log-log plot for the axial directions of insulative cups made from insulative cellular polypropylene-based materials of the present disclosure where the power law equation for predicting cell length with respect to cell density is $y=999,162,715.083x^{-2.613}$ and $R^2=0.972$.
Figure 14:
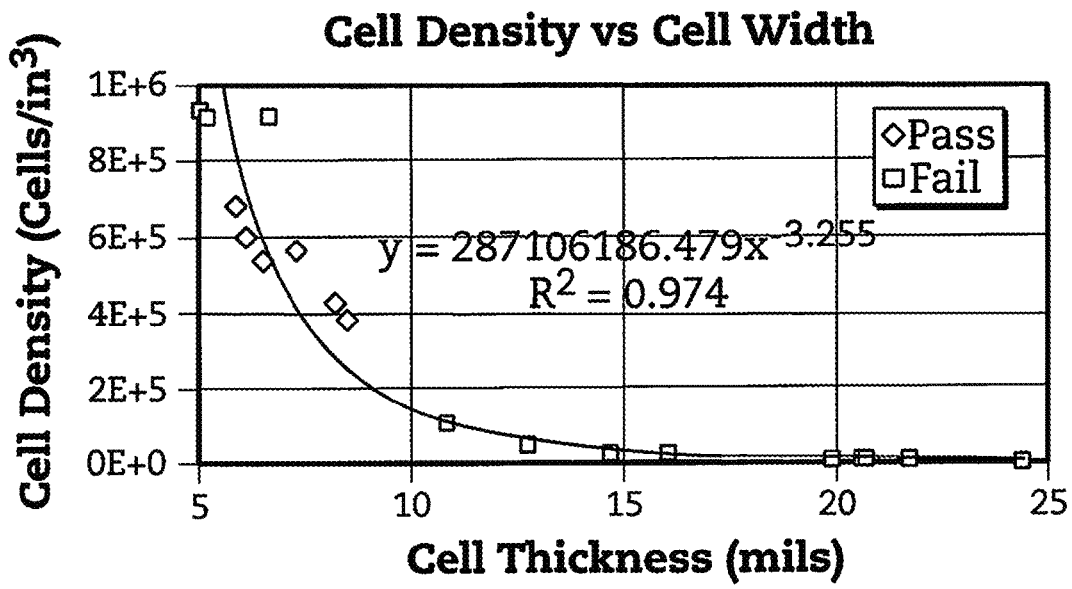
FIG. 14 is a graph with a power law regression fit of cell density vs. cell width in an x-y plot for the axial directions of insulative cups made from insulative cellular polypropylene-based materials of the present disclosure where the power law equation for predicting cell width with respect to cell density is $y=287,106,186.479x^{-3.295}$ and $R^2=0.974$.
Figure 15:
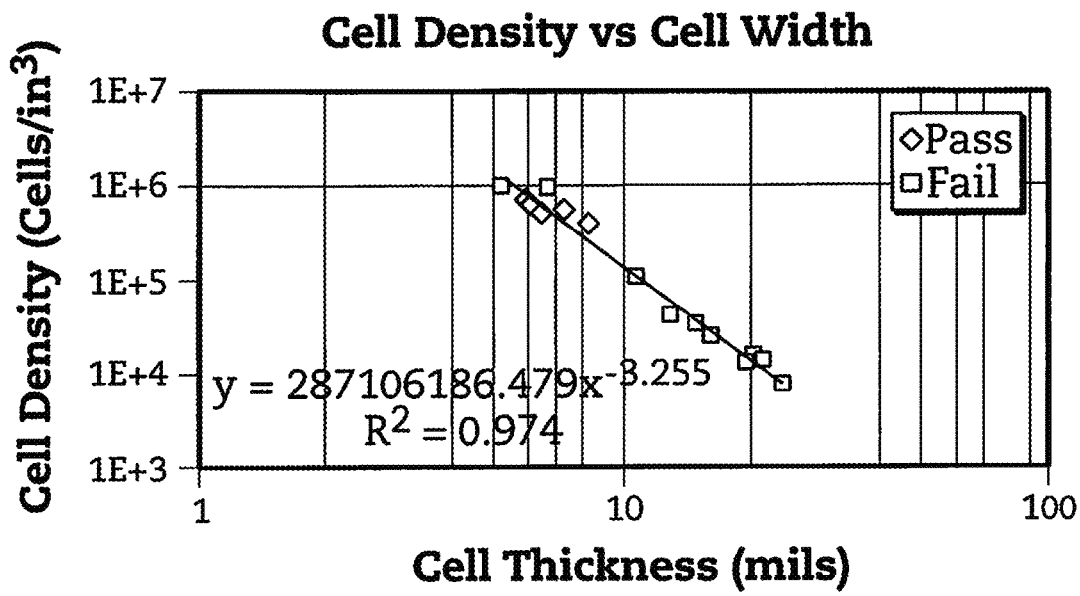
FIG. 15 is a graph with a power law regression fit of cell density vs. cell width in a log-log plot for the axial directions of insulative cups made from insulative cellular polypropylene-based materials of the present disclosure where the power law equation for predicting cell width with respect to cell density is $y=287,106,186.479x^{-3.295}$ and $R^2=0.974$.

Extrusion resin mixture 123 is conveyed by screw 114 into a second extrusion zone included in second extruder 112 as shown in FIG. 7. There, extrusion resin mixture 123 is further processed by second extruder 112 before being expelled through an extrusion die 116 coupled to an end of second extruder 112 to form an extrudate 124. As extrusion resin mixture 123 passes through extrusion die 116, gas comes out of solution in extrusion resin mixture 123 and begins to form cells and expand so that extrudate 124 is established. The extrudate 124 may be formed by an annular extrusion die 116 to form a tubular extrudate 124. A slitter 117 then cuts extrudate 124 to establish strip 82 of insulative cellular non-aromatic polymeric material as shown in FIG. 3. U.S. application Ser. No. 14/462,073, filed Aug. 18, 2014 is hereby incorporated by reference in its entirety for disclosure relating to formulations of insulative cellular non-aromatic polymeric material.

Figure 4:
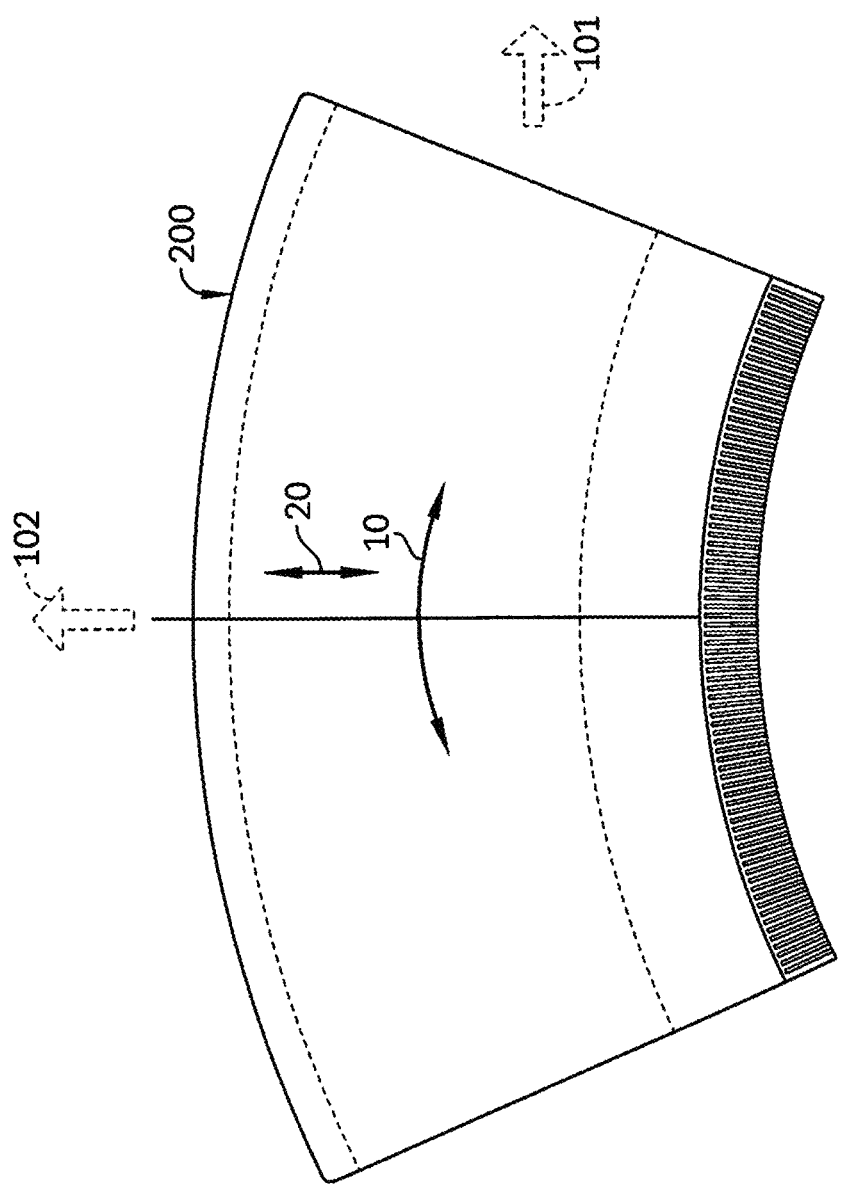
FIG. 4 is a plan view of a side-wall blank cut from the strip of insulative cellular non-aromatic polymeric material showing the circumferential direction and the axial direction.

A blank 200 used to form a portion of insulative cup 10 is shown in phantom in FIG. 3 and in FIG. 4. In one example, blank is oriented on strip 82 such that circumferential direction 10 is aligned with a machine direction 101 as shown in FIGS. 3 and 4. As a result axial direction 20 is aligned with a cross direction 102 as shown in FIGS. 3 and 4. U.S. application Ser. No. 13/526,444, filed Jun. 18, 2012 is hereby incorporated by reference in its entirety for disclosure relating to processes for forming an insulative cup 10 using a blank. Blank 200 may be oriented in any direction. Blank 200 orientation may influence cell morphology.

In other exemplary embodiments, the cell length of insulative cellular polypropylene-based material may affect the material's tendency to wrinkle during mechanical convolution. When cells are measured in the circumferential direction 10, cell length is the circumferential distance in the circumferential direction 10. When cells are measured in the axial direction 20, cell length is the axial distance in the axial direction 20.

In other exemplary embodiments, the cell width of insulative cellular polypropylene-based material may affect the material's tendency to wrinkle during mechanical convolution. Cell width is the maximum radial distance measured in a radial direction. In other exemplary embodiments, the cell wall thickness of insulative cellular polypropylene-based material may affect the material's tendency to wrinkle during mechanical convolution. In other exemplary embodiments, cell dimensional attributes may follow a power law that is independent of formula and processing conditions (see, Example 2, FIGS. 12-19). The present disclosure also provides process know how and a basis for predicting a tendency for an insulative cellular polypropylene-based material to wrinkle during mechanical convolution that is independent of material formula and processing conditions.

The insulative cellular polypropylene-based material of the present disclosure may be formed into an article, such as an insulative cup, that includes the features of a tendency to wrinkle and/or crease during mechanical convolution as described herein, and may include many, if not all, of the features of insulative performance, recyclability, puncture resistance, frangibility resistance, and microwavability, which features are described in U.S. patent application Ser. Nos. 13/491,007 and 13/491,327 both of which are incorporated herein by reference in their entirety.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, CaCO3, mica, and mixtures of at least two of the foregoing. One representative example is Heritage Plastics HT6000 Linear Low Density Polyethylene (LLDPE) Based Talc Concentrate.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

A blowing agent refers to a physical or a chemical blowing agent (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide; and combinations thereof.

In an illustrative embodiment, a nucleating agent may be about 0.1% to about 20% (w/w), about 0.25% to about 20%, about 0.5% to about 20%, about 0.75% to about 20%, about 1% to about 20%, about 1.5% to about 20%, about 2% to about 20%, about 2.5% to about 20%, about 3% to about 20%, about 3% to about 20%, about 4% to about 20%, about 4.5% to about 20%, about 5% to about 20%, about 0.1% to about 10%, about 0.25% to about 10%, about 0.5% to about 10%, about 0.75% to about 10%, about 1.0% to about 10%, about 1.5% to about 10%, about 1.0% to about 10%, about 2.0% to about 10%, about 2.5% to about 10%, about 3.0% to about 10%, about 3.5% to about 10%, about 4.0% to about 10%, about 4.5% to about 10%, about 5.0% to about 10%, about 0.1% to about 5%, about 0.25% to about 5%, about 0.5% to about 5%, about 0.75% to about 5%, about 1% to about 5%, about 1.5% to about 5%, about 1% to about 5%, about 2% to about 5%, about 2.5% to about 5%, about 3% to about 5%, about 3.5% to about 5%, or about 4% to about 5%, or about 4.5% to about 5%. In an embodiment, a nucleating agent may be about 0.5%, about 1%, about 1.5%, about 2%, about 2.5%, about 3%, about 4%, or about 5% (w/w). In an embodiment, the polymeric material lacks a nucleating agent. In an embodiment, the polymeric material lacks talc.

In an illustrative embodiment, a chemical blowing agent may be about 0 to about 5% (w/w), about 0.1% to about 5% (w/w), about 0.25% to about 5%, about 0.5% to about 5%, about 0.75% to about 5%, about 1% to about 5%, about 1.5% to about 5%, about 2% to about 5%, about 3% to about 5%, about 4% to about 5%, 0 to about 4% (w/w), about 0.1% to about 4% (w/w), about 0.25% to about 4%, about 0.5% to about 4%, about 0.75% to about 4%, about 1% to about 4%, about 1.5% to about 4%, about 2% to about 4%, about 3% to about 4%, 0 to about 3% (w/w), about 0.1% to about 3% (w/w), about 0.25% to about 3%, about 0.5% to about 3%, about 0.75% to about 3%, about 1% to about 3%, about 1.5% to about 3%, about 2% to about 3%, 0 to about 2%, about 0.1% to about 2% (w/w), about 0.25% to about 2%, about 0.5% to about 2%, about 0.75% to about 2%, about 1% to about 2%, about 1.5% to about 2%, 0 to about 1%, about 0.1% to about 1%, about 0.5% to about 1%, or about 0.75% to about 1%. In an illustrative embodiment, a chemical blowing agent may be about 0.1%, 0.5%, 0.75%, 1%, 1.5% or about 2%. In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, other alkanes, mixtures of the foregoing, and the like.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents may be used. Slip agents may be provided in a master batch pellet form and blended with the resin formulation. One example of a suitable slip agent is Ampacet 102823 Process Aid PE MB LLDPE.

In an embodiment, a slip agent may be about 0% to about 10% (w/w), about 0.5% to about 10% (w/w), about 1% to about 10% (w/w), about 2% to about 10% (w/w), about 3% to about 10% (w/w), about 4% to about 10% (w/w), about 5% to about 10% (w/w), about 6% to about 10% (w/w), about 7% to about 10% (w/w), about 8% to about 10% (w/w), about 9% to about 10% (w/w), about 0% to about 9% (w/w), about 0.5% to about 9% (w/w), about 1% to about 9% (w/w), about 2% to about 9% (w/w), about 3% to about 9% (w/w), about 4% to about 9% (w/w), about 5% to about 9% (w/w), about 6% to about 9% (w/w), about 7% to about 9% (w/w), about 8% to about 9% (w/w), about 0% to about 8% (w/w), about 0.5% to about 8% (w/w), about 1% to about 8% (w/w), about 2% to about 8% (w/w), about 3% to about 8% (w/w), about 4% to about 8% (w/w), about 5% to about 8% (w/w), about 6% to about 8% (w/w), about 7% to about 8% (w/w), about 0% to about 7% (w/w), about 0.5% to about 7% (w/w), about 1% to about 7% (w/w), about 2% to about 7% (w/w), about 3% to about 7% (w/w), about 4% to about 7% (w/w), about 5% to about 7% (w/w), about 6% to about 7% (w/w), about 0% to about 6% (w/w), about 0.5% to about 6% (w/w), about 1% to about 6% (w/w), about 2% to about 6% (w/w), about 3% to about 6% (w/w), about 4% to about 6% (w/w), about 5% to about 6% (w/w), about 0% to about 5% (w/w), about 0.5% to about 5% (w/w), about 1% to about 5% (w/w), about 2% to about 5% (w/w), about 3% to about 5% (w/w), about 4% to about 5% (w/w), about 0% to about 4% (w/w), about 0.5% to about 4% (w/w), about 1% to about 4% (w/w), about 2% to about 4% (w/w), about 3% to about 4% (w/w), about 0% to about 3% (w/w), about 0.5% to about 3% (w/w), about 1% to about 3% (w/w), about 2% to about 3% (w/w), about 0% to about 2% (w/w), about 0.5% to about 2% (w/w), about 1% to about 2% (w/w), about 0% to about 1% (w/w), or about 0.5% to about 1% (w/w). In an embodiment, a slip agent may be about 0.5%, about 1%, about 2%, about 3%, about 4%, about 5%, about 6%, about 7%, about 8%, about 9%, or about 10% (w/w). In an embodiment, the formulation lacks a slip agent.

In an embodiment, a colorant may be about 0% to about 20% (w/w), about 0% to about 15% (w/w), about 0% to about 10% (w/w), about 0% to about 5% (w/w), about 0% to about 4% (w/w), about 0.1% to about 4%, about 0.25% to about 4%, about 0.5% to about 4%, about 0.75% to about 4%, about 1.0% to about 4%, about 1.5% to about 4%, about 2.0% to about 4%, about 2.5% to about 4%, about 3% to about 4%, about 0% to about 3.0%, about 0% to about 2.5%, about 0% to about 2.25%, about 0% to about 2.0%, about 0% to about 1.5%, about 0% to about 1.0%, about 0% to about 0.5%, about 0.1% to about 3.5%, about 0.1% to about 3.0%, about 0.1% to about 2.5%, about 0.1% to about 2.0%, about 0.1% to about 1.5%, about 0.1% to about 1.0%, about 1% to about 5%, about 1% to about 10%, about 1% to about 15%, about 1% to about 20%, or about 0.1% to about 0.5%. In an embodiment, a formulation lacks a colorant.

In one exemplary embodiment, a formulation used to produce the cellular polymeric material includes at least one polymeric material. The polymeric material may include one or more base resins. In one example, the base resin is polypropylene. In an illustrative embodiment, a base resin may include Borealis WB140 HMS polypropylene homopolymer. In another illustrative embodiment, a base resin may include Braskem F020HC polypropylene homopolymer. In an embodiment, a base resin may include both Borealis WB140 HMS polypropylene homopolymer and Braskem F020HC polypropylene homopolymer.

In embodiments with more than one polypropylene copolymer base resin, different polypropylene copolymers may be used depending on the attributes desired in the formulation. Depending on the desired characteristics, the ratio of two polypropylene resins may be varied, e.g., 10%/90%, 20%/80%, 25%/75%, 30%/70%, 35%/65%, 40%/60%, 45%/55%, 50%/50%, etc. In an embodiment, a formulation includes three polypropylene resins in the base resin. Again, depending on the desired characteristics, the percentage of three polypropylene resins may be varied, 33%/33%/33%, 30%/30%/40%, 25%/25%/50%, etc.

In illustrative embodiments, a polymeric material includes a primary base resin. In illustrative embodiments, a base resin may include polypropylene. In illustrative embodiments, an insulative cellular non-aromatic polymeric material comprises a polypropylene base resin having a high melt strength and a polypropylene copolymer or homopolymer (or both). In one example, the polypropylene base resin has a drawdown force greater than about 15 cN. In another example, the polypropylene base resin has a drawdown force greater than about 20 cN. In another example, the polypropylene base resin has a drawdown force greater than about 25 cN. In another example, the polypropylene base resin has a drawdown force greater than about 35 cN.

In an embodiment, a formulation of the polymeric material comprises about 50 wt % to about 100 wt %, about 70 wt % to about 100 wt %, about 50 wt % to about 99 wt %, 50 wt % to about 95 wt %, about 50 wt % to about 85 wt %, about 55 wt % to about 85 wt %, about 80 wt % to about 85 wt %, about 80 wt % to about 90 wt %, about 80 wt % to about 91 wt %, about 80 wt % to about 92 wt %, about 80 wt % to about 93 wt %, about 80 wt % to about 94 wt %, about 80 wt % to about 95 wt %, about 80 wt % to about 96 wt %, about 80 wt % to about 97 wt %, about 80 wt % to about 98 wt %, about 80 wt % to about 99 wt %, about 85 wt % to about 90 wt %, or about 85 wt % to about 95 wt % of the primary base resin. In an embodiment, a colorant may be about 80%, 81%, 82%, 83%, 84%, 85%, 86%, 87%, 88%, 89%, 90%, 91%, 92%, 93%, 94%, 95%, 96%, 97%, 98%, 99%, or 100%.

As defined hereinbefore, any suitable primary base resin may be used. One illustrative example of a suitable polypropylene base resin is DAPLOY™ WB140 homopolymer (available from Borealis A/S) which is a high melt strength structural isomeric modified polypropylene homopolymer.

In illustrative embodiments, a polymeric material includes a secondary resin, wherein the secondary resin may be a polypropylene copolymer or homopolymer (or both). In another embodiment, a secondary resin may be about 0 wt % to about 50 wt %, about 0 wt % to about 30 wt %, about 0 wt % to about 25 wt %, about 0 wt % to about 20 wt %, about 0 wt % to about 15 wt %, about 10 wt % to about 50 wt %, about 10 wt % to about 40 wt %, about 10 wt % to about 30 wt %, about 10 wt % to about 25 wt %, about 10 wt % to about 20 wt %, or about 10 wt % to about 15 wt % of a secondary resin. In an embodiment, a polymeric material includes about 0 wt %, about 10 wt %, about 15 wt %, about 20 wt %, about 25 wt %, or about 30 wt %. In an embodiment, a polymeric material does not have a secondary resin. In an embodiment, a secondary resin may be a high crystalline polypropylene homopolymer, such as F020HC (available from Braskem) or PP 527K (available from Sabic). In an embodiment, a polymeric material lacks a secondary resin.

Figure 22:
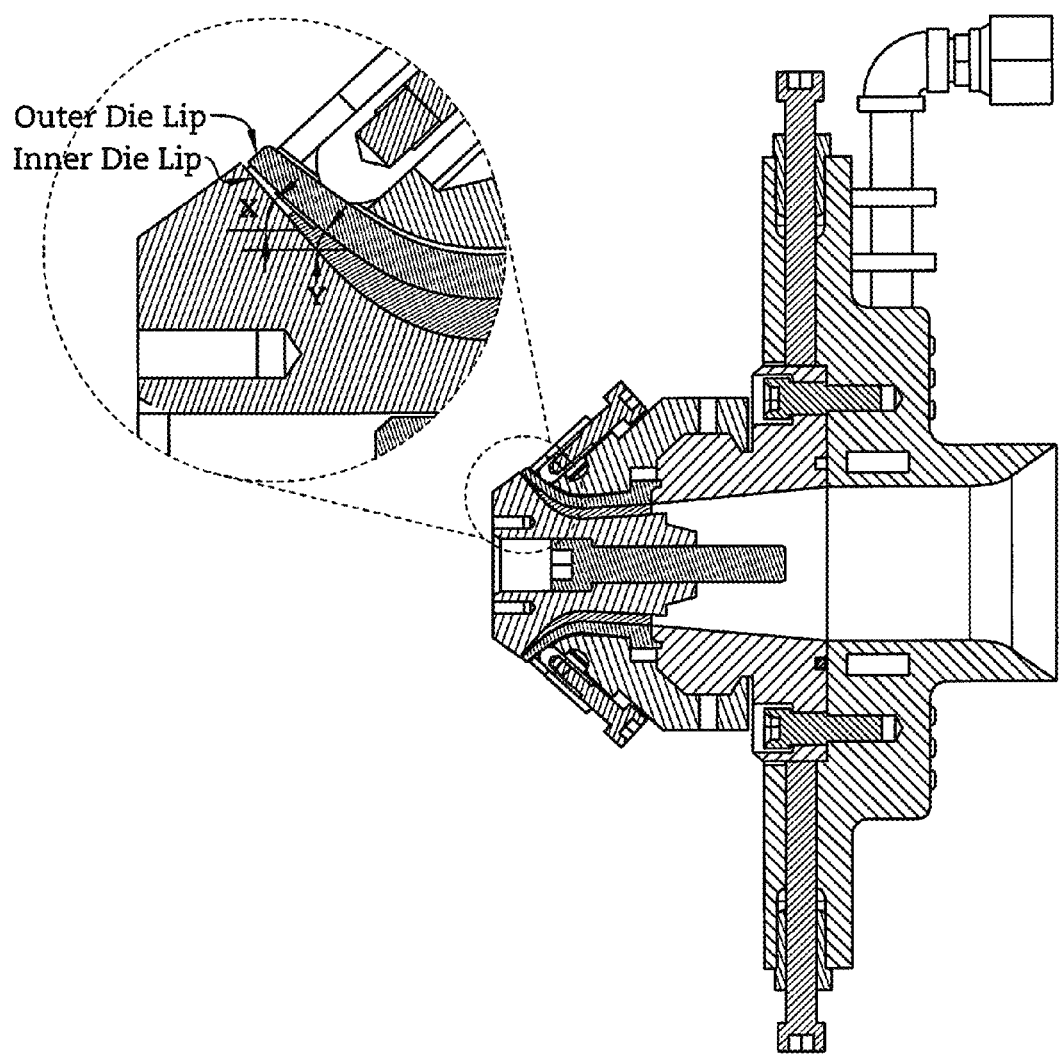
FIG. 22 is an elevation view of an extrusion nozzle in accordance with the present disclosure with portions enlarged to show an inner die lip angle X and an outer die lip angle Y.
Figure 23:
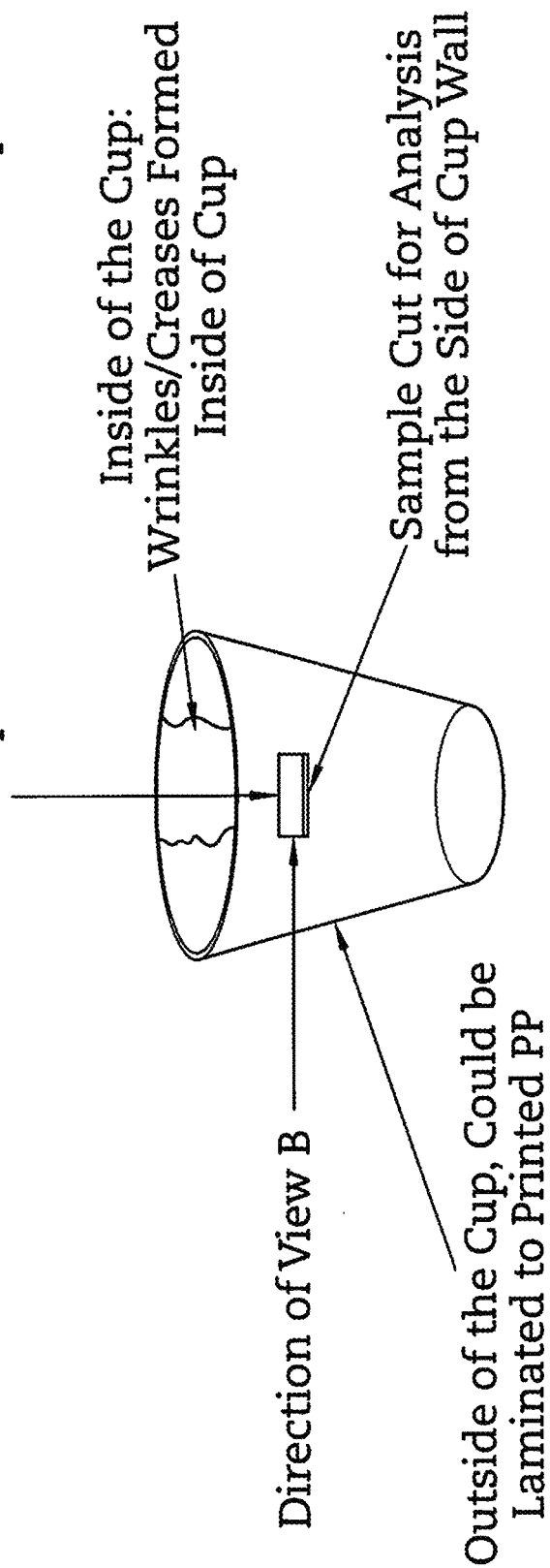
FIG. 23 illustrates sampling for microscopy and X-Ray analysis for which samples were cut from the side of an insulative cup side wall and analyzed in two perpendicular directions: View A from top to bottom of the cup and view B looking sideways.

The term die exit angle means the angle subtended by the central axis of the torpedo mandrel and the outer surface of the torpedo mandrel adjacent the exit lip of an extrusion apparatus. Such an angle may be referred to as an inner lip angle, and is commonly understood to be angle X as shown in FIG. 22. The die exit angle may be an angle as disclosed in any of the following numbered lines 1-15:
1.) 1-60°
2.) 10-60°
3.) 20-60°
4.) 30-60°
5.) 30-58°
6.) 32-58°
7.) 35-58°
8.) 35-56°
9.) 37-54°
10.) 40-54°
11.) 40-52°
12.) 40-50°
13.) 40-48°
14.) 42-48°
15.) 42-46°

In particular embodiments of the disclosure, the die exit angle may be formed by an inner lip angle identified as X in FIG. 22 and an outer lip angle identified as Y in FIG. 22. Outer lip angle Y is the angle subtended by the lip of the extrusion apparatus and the central axis of a torpedo mandrel. Inner lip angle X is the angle subtended by the central axis of the torpedo mandrel and the outer surface of the torpedo mandrel adjacent the lip of the extrusion apparatus as shown in FIG. 22. Angles X and Y may be configured as disclosed in any of the following numbered lines 16-22:
16.) X is 45-60° and Y is 35-55°
17.) X is 47-58° and Y is 37-50°
18.) X is 47-56° and Y is 37-48°
19.) X is 47-54° and Y is 39-46°
20.) X is 48-54° and Y is 40-45°
21.) X is 49° and Y is 41°
22.) X is 53° and Y is 41°

In an embodiment, the process comprises extruding a formulation at any of the angles disclosed in numbered lines 1-22 above, wherein the formulation comprises:
  50-100 wt % of a primary base resin
  0-50 wt % of a secondary resin
  0-5 wt % of a chemical blowing agent
  0.1-20 wt % of a nucleating agent
  0-20 wt % of a colorant
  0-10 wt % of a slip agent In an embodiment, the process comprises extruding a formulation at any of the angles defined in numbered paragraphs 1-22 above, wherein the formulation comprises:
  50-100 wt % of a primary base resin
  0-50 wt % of a secondary resin
  0-2 wt % of a chemical blowing agent
  0-20 wt % of a physical nucleating agent
  0-20 wt % of a colorant
  0-10 wt % of a slip agent In an embodiment, the process comprises extruding a formulation at any of the angles disclosed in the numbered lines 1-22 above, wherein the formulation comprises:
  75-85 wt % of a primary base resin
  10-20 wt % of a secondary resin
  0-0.1 wt % of a chemical blowing agent
  0.1-3 wt % of a nucleating agent
  0-2 wt % of a colorant
  0-4 wt % of a slip agent In an embodiment, the process comprises extruding a formulation at any of the angles disclosed in the numbered lines 1-22 above, wherein the formulation comprises:
  50-99.65 wt % of the primary base resin
  0-50 wt % of the secondary resin
  0-10 wt % of the slip agent
  0-10 wt % of the colorant
  0.35-1.5 wt % of nucleating agent In an embodiment, the process comprises extruding a formulation at any of the angles disclosed in the numbered lines 1-22 above, wherein the formulation comprises:
  50-95 wt % of the primary base resin
  0-50 wt % of the secondary resin
  0-10 wt % of the slip agent
  0-10 wt % of the colorant
  0.4-1.2 wt % of nucleating agent In an embodiment, the process comprises extruding a formulation at any of the angles disclosed in the numbered lines 1-22 above, wherein the formulation comprises:
  55-85 wt % of the primary base resin
  0-50 wt % of the secondary resin
  0-10 wt % of the slip agent
  0-10 wt % of the colorant
  0.45-1.25 wt % of nucleating agent In an embodiment, the process comprises extruding a formulation at any of the angles disclosed in the numbered lines 1-22 above, wherein the formulation comprises:
  50-99.69 wt % of the primary base resin
  0-50 wt % of the secondary resin
  0-10 wt % of the slip agent
  0-10 wt % of the colorant
  0.01-1.5 wt % of the primary nucleating agent
  0.3-1.7 wt % of the secondary nucleating agent In an embodiment, the process comprises extruding a formulation at any of the angles disclosed in the numbered lines 1-22 above, wherein the formulation comprises:
  50-95 wt % of the primary base resin
  0-50 wt % of the secondary resin
  0-10 wt % of the slip agent
  0-10 wt % of the colorant
  0.02-1.0 wt % of the primary nucleating agent
  0.4-1.5 wt % of the secondary nucleating agent In an embodiment, the process comprises extruding a formulation at any of the angles disclosed in the numbered lines 1-22 above, wherein the formulation comprises:
  55-85 wt % of the primary base resin
  0-50 wt % of the secondary resin
  0-10 wt % of the slip agent
  0-10 wt % of the colorant
  0.03-0.7 wt % of the primary nucleating agent
  0.45-1.25 wt % of the secondary nucleating agent In an embodiment, the process comprises extruding a formulation at any of the angles disclosed in the numbered lines 1-22 above, wherein the formulation comprises:
  78-83 wt % of a primary base resin
  14-16 wt % of a secondary resin
  0-0.05 wt % of a chemical blowing agent
  0.25-2 wt % of a nucleating agent
  1-2 wt % of a colorant
  1.5-3.5 wt % of a slip agent In the preceding embodiments, the primary base resin may comprise polypropylene. In another illustrative embodiment, the primary base resin comprises at least one of Borealis WB140 HMS polypropylene homopolymer and Braskem F020HC polypropylene homopolymer. In another embodiment, the primary base resin is Borealis WB140 HMS polypropylene homopolymer.

In the preceding embodiments, the secondary resin may comprise at least one polypropylene copolymer or polypropylene homopolymer. In another embodiment, the secondary resin comprises at least one of Braskem F020HC polypropylene homopolymer and PP 527K (available from Sabic). In another embodiment, the secondary resin is Braskem F020HC polypropylene homopolymer.

In the preceding embodiments, the chemical blowing agent may comprise citric acid, or a citric acid-based material. In an illustrative embodiment the chemical blowing agent is Hydrocerol™ CF-40E (available from Clariant Corporation).

In the preceding embodiments, the nucleating agent may comprise talc, $CaCO_3$, mica, or mixtures thereof. In an illustrative embodiment, the nucleating agent is one or more of HT4HP talc (available from Heritage Plastics), HT6000 Linear Low Density Polyethylene (LLDPE) (available from Heritage Plastics), and Techmer PM PPM 16466 Silica. In another embodiment, the nucleating agent is HT4HP talc (available from Heritage Plastics) or Techmer PM PPM 16466 Silica. A primary nucleating agent may be defined as a chemical blowing agent or chemical foaming agent, itself comprising a nucleating agent. In another embodiment, a primary nucleating agent is Hydrocerol™ CF-40E™ (available from Clariant Corporation). In an illustrative embodiment, a secondary nucleating agent is selected from HPR-803i fibers (available from Milliken) or talc In the preceding embodiments, the colorant may comprise at least one of Colortech 11933-19 $TiO_2$ PP or Cell Stabilizer. In another embodiment, the colorant is Colortech 11933-19 $TiO_2$ PP.

In the preceding embodiments, the slip agent may comprise one or more amides of fats or fatty acids, such as erucamide and oleamide. The slip agent may also comprise one or more low molecular weight amides and fluoroelastomers. In an embodiment, the slip agent is Ampacet 102823 Process Aid PE MB LLDPE.

The method of any of the preceding embodiments may also comprise adding $CO_2$ to the formulation prior to extrusion at a rate of 1-4 lbs/hr. In an embodiment, the $CO_2$ is added at a rate of 2-3 lbs/hr. In another embodiment, the $CO_2$ is added at a rate of 2.2-2.8 lbs/hr. Such practice may also be referred to as adding a physical blowing agent.

EXAMPLES

The following examples are set forth for purposes of illustration only. Parts and percentages appearing in such examples are by weight unless otherwise stipulated.

Example 1: Formulation, Extrusion, and Sheet Formation

An Exemplary Formulation Used to Illustrate the Present Disclosure is presented below and is described in U.S. Provisional Application Ser. No. 61/719,096, the disclosure of which is hereby incorporated herein by reference in its entirety:

DAPLOY™ WB140 polypropylene homopolymer (available from Borealis A/S) was used as the polypropylene base resin. F020HC, available from Braskem, a polypropylene homopolymer resin, was used as the secondary resin. The two resins were blended with: Hydrocerol™ CF-40E™ as a chemical blowing agent, talc as a nucleation agent, $CO_2$ as a blowing agent, a slip agent, and titanium dioxide as a colorant. Percentages were:
  81.45% Primary resin: high melt strength polypropylene Borealis WB140 HMS
  15% Secondary resin: F020HC (Braskem) homopolymer polypropylene
  0.05% Chemical blowing agent: Clariant Hyrocerol CF-40E™
  0.5% Nucleation agent: Heritage Plastics HT4HP Talc
  1% Colorant: Colortech 11933-19 $TiO_2$ PP
  2% Slip agent: Ampacet™ 102823 Process Aid LLDPE (linear low-density polyethylene), available from Ampacet Corporation The formulation described above was added to an extruder hopper. The extruder heated the formulation to form a molten resin mixture. To this mixture was added 2.2 lbs/hr $CO_2$, which was injected into the resin blend to expand the resin and reduce density. The mixture thus formed was extruded through a die head into a sheet as described in U.S. application Ser. No. 13/491,007, the disclosure of which is hereby incorporated herein by reference in its entirety.

High resolution microscopy may be used to determine the dimensional properties of insulative cellular non-aromatic polymeric material. The Keyence VHX-1000 Digital Microscope was used to determine the dimensional properties of insulative cellular polypropylene-based material cells of the present disclosure. In one exemplary embodiment, cell length may be the dimensional property denoting maximum distance from top to bottom of cells running parallel to the circumferential direction 10 of an insulative cup made from insulative cellular non-aromatic polymeric material. In another exemplary embodiment, cell length may also be the dimensional property denoting maximum distance from top to bottom of cells running parallel to the axial direction 20 of an insulative cup made from insulative cellular non-aromatic polymeric material. In yet another exemplary embodiment, cell width may be the dimensional property denoting maximum distance from top to bottom of cells running in the radial direction of an insulative cup made from insulative cellular non-aromatic polymeric material. In still another exemplary embodiment, cell wall thickness may be the dimensional property denoting maximum distance between separated cell voids across a line running perpendicular to the circumferential and axial direction.

Figure 5:
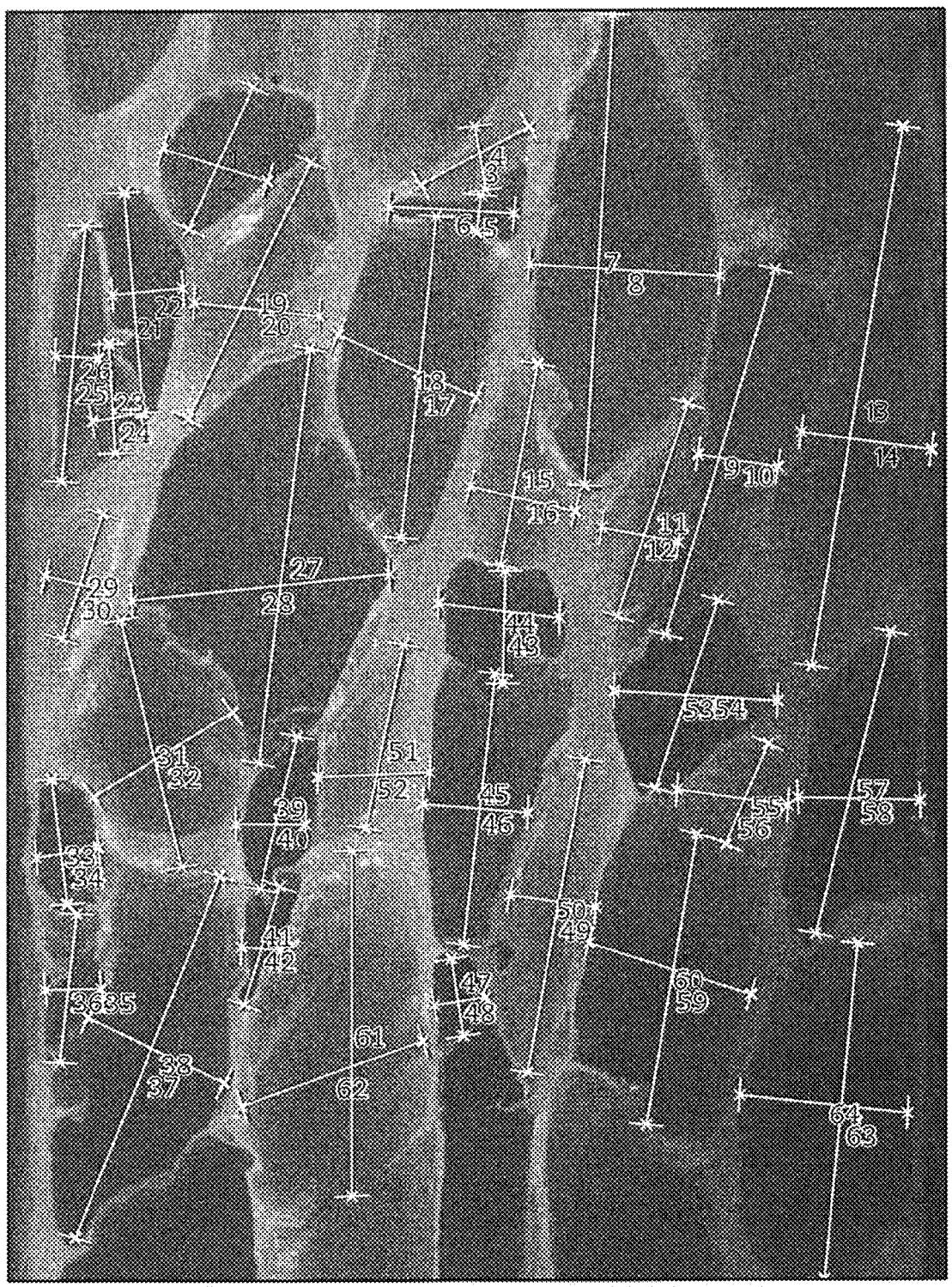
FIG. 5 is a microscopy image of an axial portion of an insulative cup made from a 44°-extruded sheet strip from an insulative cellular polypropylene-based material of the present disclosure used to quantify dimensional morphology of cell length and width.
Figure 6:
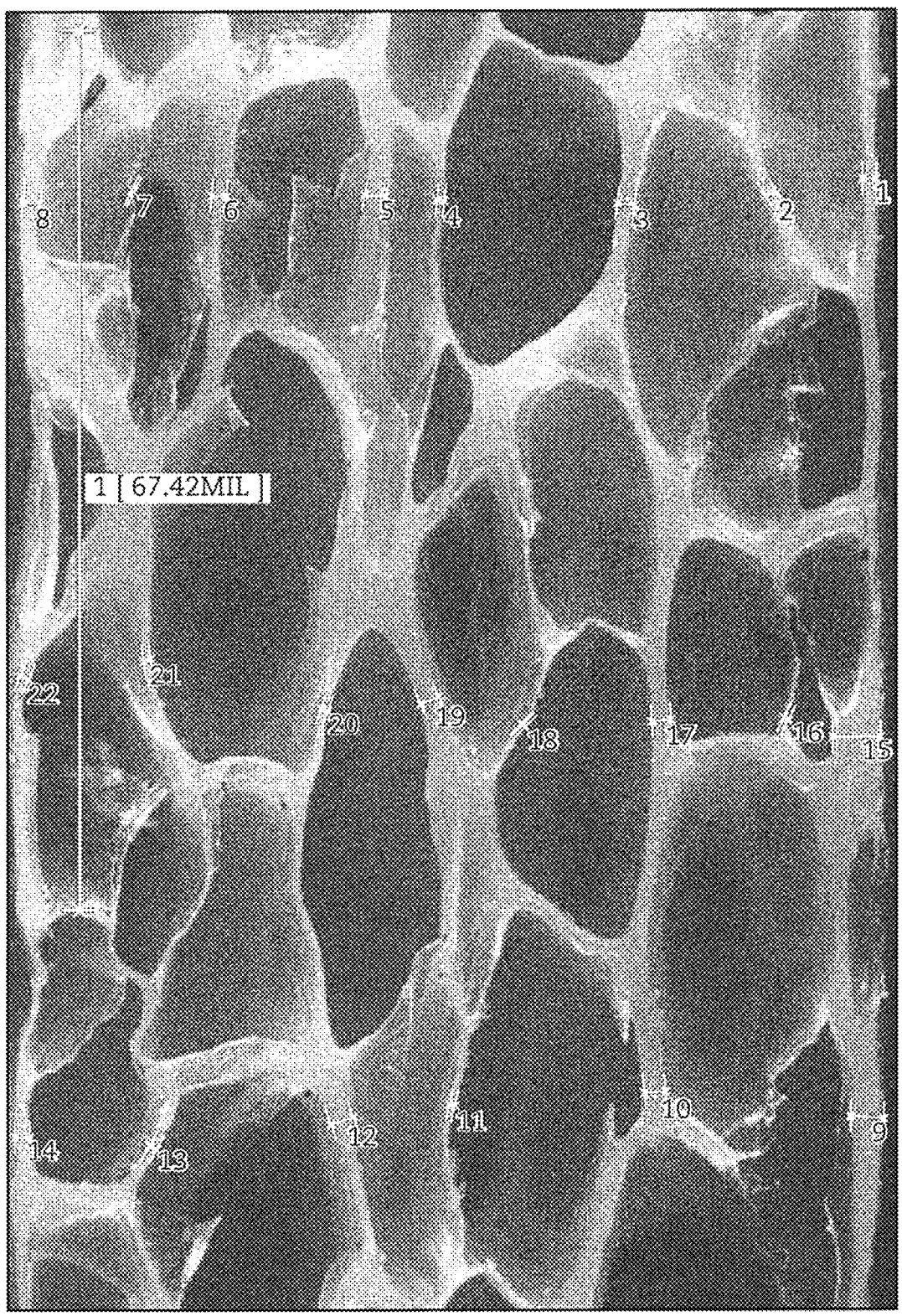
FIG. 6 is a microscopy image of cell wall measurement for a portion of an insulative cup made from a 44°-extruded sheet strip from an insulative cellular polypropylene-based material of the present disclosure used to quantify dimensional morphology.

In order to assess the effect of cell morphology of an extruded sheet of insulative cellular polypropylene-based material on the quality of an article formed therewith, such as an insulative cup, a minimum of 700 measurement points were chosen for each of the length and width dimensional properties in order to verify consistency throughout a strip of the material. A minimum of 200 measurement points were chosen for cell wall thickness as a dimensional property in order to verify consistency throughout the strip of insulative cellular polypropylene-based material. In one exemplary embodiment, a sheet of insulative cellular polypropylene-based material may be extruded from an enclosed die volume at an angle of 44°. In another exemplary embodiment, a sheet of insulative cellular polypropylene-based material may be extruded from an enclosed die volume at an angle of 90°. A sheet of insulative cellular polypropylene-based material extruded at an angle of 44° is referred to herein as Material C. A sheet of insulative cellular polypropylene-based material extruded at an angle of 90° is referred to herein as Material D. Strips of insulative cellular polypropylene-based material from 44° and 90° exit angles were quantitatively compared as shown in FIGS. 5-7.

Example 1: Test Method

The typical testing method used for cell morphology measurement was as follows:
  1.) Cut a side wall blank for an insulative cup as shown in FIG. 4 from a strip of insulative cellular polypropylene-based material as suggested by FIG. 3 or at any other orientation.

2.) Make an insulative cup using the side wall blank by the method disclosed in U.S. patent application Ser. No. 13/526,454 filed on Jun. 18, 2004, the disclosure of which is hereby incorporated by reference herein in its entirety.
3.) Cut a strip of the side wall of the insulative cup along the axial direction and circumferential direction.
4.) Hold the material with a flat clamp and use a razor blade to perform a fine shave.
5.) Focus the microscope at 100× and adjust lighting onto the material.
6.) Perform length and width measurements of each unique cell in the axial direction and circumferential direction orientation and record values as suggested by FIG. 5.
7.) Perform cell wall thickness measurements across 3-4 tangent lines to overall length of each unique cell in the axial and circumferential orientation and record the values as suggested by FIG. 6.
8.) Move microscope visual field so the bottom of the most upper incomplete cell is touching the bottom of the screen.
9.) Repeat steps 6-7 on each new unique cell until at least 0.500" of the strip is measured.

A sheet of insulative cellular polypropylene-based material produced as described herein typically possessed a density of about 0.1615 g/cm$^3$ and material thickness of about 0.066 inches (1.6764 mm).

Example 1: Test Results

The cell morphology of an extruded sheet of insulative cellular polypropylene-based material exiting the enclosed die volume at angles of 44° and 90° differed greatly in terms of cell height, cell width, cell aspect ratio, and cell wall thickness as shown in Table 1. In the circumferential direction, Material C had an average length of 19.54 mils (49.63 mm), an average width of 8.53 mils (21.67 mm), an average cell wall thickness of 1.02 mils (2.59 mm), and average aspect ratio of 2.29. In the circumferential direction, Material D had an average length of 17.01 mils (43.21 mm), an average width of 5.22 mils (13.26 mm), an average cell wall thickness of 0.77 mils (1.96 mm), and average aspect ratio of 3.26.

In the axial direction, Material C had an average length of 18.45 mils (46.86 mm), an average width of 8.28 mils (21.03 mm), an average cell wall thickness of 0.96 mils (2.44 mm), and average aspect ratio of 2.23. In the axial direction, Material D had an average length of 16.43 mils (41.73 mm), an average width of 5.30 mils (13.46 mm), an average cell wall thickness of 0.84 mils (2.13 mm), and average aspect ratio of 3.10.

Moreover, formation of wrinkled insulative cellular polypropylene-based material was found to occur when the exit angle of curvature increased from 44° to 90° as suggested by Example 1, FIGS. 5-7. Based on these results, it may be concluded that die exit angles from enclosed die volumes create different material morphology, with differing tendencies to wrinkle and/or crease, when recipe and process conditions are held constant. In one exemplary embodiment, insulative cellular polypropylene-based material with a tendency to wrinkle during convolution may be created concomitantly with a decrease in die exit angle. The higher the angle of die exit, the easier it is to increase the cell aspect ratio, thus enabling preparation of a sheet of insulative cellular polypropylene-based material that possesses relatively high cell aspect ratios. In one example, the relatively high cell aspect ratio is greater than about 2.5. In another example, the relatively high cell aspect ratio is greater than about 3.

In exemplary embodiments, die exit angles within an inclusive range of 50°-60° may produce insulative cellular polypropylene-based material with a tendency to wrinkle during convolution. In other exemplary embodiments, die exit angles within an inclusive range of 40°-50° may produce insulative cellular polypropylene-based material with a tendency to wrinkle during convolution. In other exemplary embodiments, die exit angles within an inclusive range of 30°-40° may produce insulative cellular polypropylene-based material with a tendency to wrinkle during convolution. In other exemplary embodiments, die exit angles within an inclusive range of 20°-30° may produce insulative cellular polypropylene-based material with a tendency to wrinkle during convolution. In other exemplary embodiments, die exit angles within an inclusive range of 10°-20° may produce insulative cellular polypropylene-based material with a tendency to wrinkle during convolution. In other exemplary embodiments, die exit angles within an inclusive range of 0°-10° may produce insulative cellular polypropylene-based material with a tendency to wrinkle during convolution. The lower the angle of die exit, the further from 1 the cell aspect ratio becomes, especially in the direction parallel to the flow of insulative cellular polypropylene-based material. Without wishing to be bound by theory, higher cell aspect ratios may increase local stress concentrations that are experienced during convolution of insulative cellular polypropylene-based material, thus leading to material with a greater tendency to wrinkle during convolution.

TABLE 1

Circumferential Direction and Axial Direction Dimensional Attributes of Material C and Material D

| | Cells dimensions [milli inches] | 44° Material C | 90° Material D |
|---|---|---|---|
| Circumferential Direction | Cell length | 19.54 | 17.01 |
| | Cell width | 8.53 | 5.22 |
| | Circumferential Direction Cell Aspect Ratio | 2.29 | 3.26 |
| | Cell Wall Thickness | 1.02 | 0.77 |
| Axial Direction | Cell length | 18.45 | 16.43 |
| | Cell width | 8.28 | 5.30 |
| | Axial Direction Cell Aspect Ratio | 2.23 | 3.10 |
| | Cell Wall Thickness | 0.96 | 0.84 |

Example 2: Formulation, Extrusion, and Sheet Formation

High resolution microscopy may be used to determine the dimensional properties of insulative cellular non-aromatic polymeric materials. The Keyence VHX-1000 Digital Microscope and Keyence VHX-2000 Digital Microscope were used to determine the dimensional properties of insulative cellular polypropylene-based material cells from the present disclosure.

Nine specified formulations with dissimilar processing conditions as shown in Table 2 produced cell dimensional properties that were found to follow a power law model with high accuracy and produce material that may possess a tendency to wrinkle during convolution. The following variables were held constant throughout iterations 1-18: 1° extruder temperature, 2° temperature, extruder speed, sheet pull rate, cooling mandrel diameter, cooling mandrel temperature, and overall die temperature as shown in Table 3A. The following variables were altered throughout the aforementioned trial iterations: formula, exit die pressure, die lip angle, die air ring cooling [l/min], and orientation as shown in Table 3A. The following variables were held constant throughout iterations 19-45: 1° extruder temperature, extruder speed, sheet pull rate, cooling mandrel diameter, cooling mandrel temperature, and overall die temperature as shown in Table 3B. The following variables were altered throughout the aforementioned trial iterations: 2° temperature, exit die pressure, die air ring cooling [l/min], $CO_2$%, and orientation as shown in Table 3B. Iterations 46-50 were conducted in a manner similar to iterations 1-45 in order to investigate the occurrence of creasing during convolution of insulative cellular polypropylene-based material into a circular article (see, Table 3C).

Axial direction and circumferential direction dimensional attributes of 50 different iterations with nine specified formulations were incorporated in the analysis in order to produce data sufficient for high accuracy and precision, as shown in FIGS. 5-7. The specific formulation described above for Example 1 as well as eight other formulations were used to illustrate this aspect of the present disclosure as shown in Table 2.

TABLE 2

Formulations and Processing Conditions

| Formula # | 1° Resin | 2° Resin | Chemical Blowing Agent | Additive #1 | Additive #2 | Additive #3 | Additive #4 | $CO_2$ (Lbs/Hr) [Table 3B] |
|---|---|---|---|---|---|---|---|---|
| 1 | 81.5% Borealis WB140 HMS | 15% Braskem F020HC | None | 0.5% Heritage Plastics HT4HP Talc | 1% Colortech 11933-19 $TiO_2$-PP | 2% Ampacet ™ 102823 Process Aid | None | 2.2-2.3 |
| 2 | 82.5% Borealis WB140 HMS | 15% Braskem F020HC | None | 0.5% Techmer PM PPM16466 Silica | None | 2% Ampacet ™ 102823 Process Aid | None | 2.2-2.3 |
| 3 | 82.5% Borealis WB140 HMS | 15% Braskem F020HC | None | 0.5% Techmer PM PPM16464 Silica | None | 2% Ampacet ™ 102823 Process Aid | None | 2.2-2.3 |
| 4 | 82.5% Borealis WB140 HMS | 15% Braskem F020HC | None | 0.5% Heritage Plastics HT4HP Talc | None | 2% Ampacet ™ 102823 Process Aid | None | 2.2-2.3 |
| 5 | 81.5% Borealis WB140 HMS | 15% Braskem F020HC | None | 0.5% Heritage Plastics HT4HP Talc | 1% Cell Stabilizer | 2% Ampacet ™ 102823 Process Aid | None | 2.2-2.3 |
| 6 | 81.45% Borealis WB140 HMS | 15% Braskem F020HC | 0.05% Clariant Hydrocerol CF-40E ™ | 0.5% Heritage Plastics HT4HP Talc | 1% Colortech 11933-19 $TiO_2$-PP | 2% Ampacet ™ 102823 Process Aid | None | 2.2-2.4 |
| 7 | 81.45% Borealis WB140 HMS | 15% Braskem F020HC | 0.05% Clariant Hydrocerol CF-40E ™ | 0.5% Techmer PM PPM16466 Silica | 1% Colortech 11933-19 $TiO_2$-PP | 2% Ampacet ™ 102823 Process Aid | None | 2.2-2.4 |
| 8 | 79.95% Borealis WB140 HMS | 15% Braskem F020HC | 0.05% Clariant Hydrocerol CF-40E ™ | 2% Heritage Plastics HT4HP Talc | 1% Colortech 11933-19 $TiO_2$-PP | 2% Ampacet ™ 102823 Process Aid | None | 2.8 |
| 9 | 77.95% Borealis WB140 HMS | 15% Braskem F020HC | 0.05% Clariant Hydrocerol CF-40E ™ | 2% Heritage Plastics HT4HP Talc | 1% Colortech 11933-19 $TiO_2$-PP | 2% Ampacet ™ 102823 Process Aid | 2% Techmer PM PPM16466 Silica | 2.8 |

TABLE 3A

Trial Iterations

| Iteration # | Formula # | Orientation | Wrinkle |
|---|---|---|---|
| 1 | 8 | Axial Direction | No |
| 2 | 1 | Circumferential Direction | Yes |
| 3 | 9 | Axial Direction | No |
| 4 | 9 | Circumferential Direction | No |
| 5 | 6 | Axial Direction | Yes |
| 6 | 6 | Circumferential Direction | Yes |
| 7 | 6 | Axial Direction | No |
| 8 | 6 | Circumferential Direction | No |
| 9 | 7 | Axial Direction | No |
| 10 | 7 | Circumferential Direction | No |

TABLE 3A-continued

Trial Iterations

| Iteration # | Formula # | Orientation | Wrinkle |
|---|---|---|---|
| 11 | 3 | Circumferential Direction | Yes |
| 12 | 3 | Circumferential Direction | Yes |
| 13 | 2 | Circumferential Direction | Yes |
| 14 | 2 | Circumferential Direction | Yes |
| 15 | 4 | Circumferential Direction | Yes |
| 16 | 4 | Circumferential Direction | Yes |
| 17 | 5 | Circumferential Direction | Yes |
| 18 | 5 | Circumferential Direction | Yes |

TABLE 3B

Trial Iterations (continued)

| Iteration # | Formula # | Secondary Extruder Temp | CO2 % | Orientation | Wrinkle |
|---|---|---|---|---|---|
| 19 | 1 | 335 | 2.2 | Axial Direction | No |
| 20 | 1 | 335 | 2.2 | Axial Direction | No |
| 21 | 1 | 335 | 2.2 | Axial Direction | No |
| 22 | 1 | 335 | 2.2 | Axial Direction | No |
| 23 | 1 | 335 | 2.2 | Axial Direction | No |
| 24 | 1 | 330 | 2.2 | Axial Direction | Yes |
| 25 | 1 | 330 | 2.2 | Circumferential Direction | Yes |
| 26 | 1 | 330 | 2.2 | Circumferential Direction | No |
| 27 | 1 | 330 | 2.2 | Axial Direction | No |
| 28 | 1 | 330 | 2.2 | Circumferential Direction | No |
| 29 | 1 | 330 | 2.6 | Axial Direction | Yes |
| 30 | 1 | 330 | 2.6 | Circumferential Direction | Yes |
| 31 | 1 | 330 | 2.6 | Axial Direction | No |
| 32 | 1 | 330 | 2.6 | Circumferential Direction | No |
| 33 | 1 | 350 | 2.2 | Axial Direction | Yes |
| 34 | 1 | 350 | 2.2 | Circumferential Direction | Yes |
| 35 | 1 | 350 | 2.2 | Axial Direction | No |
| 36 | 1 | 350 | 2.2 | Circumferential Direction | No |
| 37 | 1 | 350 | 2.2 | Circumferential Direction | No |
| 38 | 1 | 350 | 2.2 | Circumferential Direction | No |
| 39 | 1 | 350 | 2.2 | Circumferential Direction | No |
| 40 | 1 | 350 | 2.2 | Axial Direction | Yes |
| 41 | 1 | 350 | 2.2 | Axial Direction | Yes |
| 42 | 1 | 350 | 2.6 | Axial Direction | Yes |
| 43 | 1 | 350 | 2.6 | Circumferential Direction | Yes |
| 44 | 1 | 350 | 2.2 | Axial Direction | No |
| 45 | 1 | 350 | 2.2 | Circumferential Direction | No |

TABLE 3C

Trial Iterations (continued)

| Iteration | Formula | Orientation | Wrinkle |
|---|---|---|---|
| 46 | 1 | Circumferential Direction | No |
| 47 | 1 | Circumferential Direction | No |
| 48 | 1 | Circumferential Direction | Yes |
| 49 | 1 | Axial Direction | Yes |
| 50 | 1 | Circumferential Direction | No |

Example 2: Test Method

The typical testing method used for cell morphology measurement was as follows:
1.) Cut a side wall blank for an insulative cup as shown in FIG. 4 from a strip of insulative cellular polypropylene-based material as suggested by FIG. 3 or at any other orientation.
2.) Make an insulative cup using the side wall blank by the method disclosed in U.S. patent application Ser. No. 13/526,454 filed on Jun. 18, 2004, disclosure of which is hereby incorporated by reference herein in its entirety.
3.) Cut a strip of the side wall of the insulative cup along the axial direction and circumferential direction.
4.) Hold the material with a flat clamp and use a razor blade to perform a fine shave.
5.) Focus the microscope at 100× and adjust lighting onto the material.
6.) Perform length and width measurements of each unique cell in the axial direction and circumferential direction orientation and record values as suggested by FIG. 5.
7.) Count the number of measured unique cells and record the values as suggested by FIG. 5.
8.) Perform cell wall thickness measurements across 3-4 tangent lines to overall length of each unique cell in the axial direction and circumferential orientation and record the values as suggested by FIG. 6.
9.) Perform three overall strip thickness measurements starting from the bottom of the first measured cell group, to the middle of the cell group, to the top of the cell group as suggested by FIG. 7.
10.) Perform an overall length measurement starting from the lowest complete cell to the highest complete cell as suggested by FIG. 7.
11.) Move microscope visual field so the bottom of the most upper incomplete cell is touching the bottom of the screen.
12.) Repeat steps 6-11 on each new unique cell until about 0.200" to 0.800" of the strip is measured. Ensure that the overall length and cell composition does not overlap. Each overall length measurement after the first measurement is taken from the top of the previous highest complete cell to the top of the current highest complete cell.

A sheet of insulative cellular polypropylene-based material produced as described herein typically possessed a density of about 0.1615 g/cm$^3$ and material thickness of about 0.066 inches (1.6764 mm).

Example 2: Test Analysis

All cell measurements were performed on over 7500 unique cell units from 50 different samples produced in various ways as described above. Although the maximum window view range of the Keyence digital microscope was 100 mils by 100 mils, careful attention was paid to ensure that each cell was unique and that the overall height and width of the measured strip was an average of values. A total of six (6) different dimensional parameters were measured for iterations 1-18.

In one exemplary embodiment, dimensional parameters of overall strip length (L), overall strip thickness (T), and total numbers of cells in the measured strip area (n) may be classified as bulk properties because they describe an overall cell property. In another exemplary embodiment, dimensional parameters of cell length (l), cell width (w), and cell wall thickness (t) may be classified as cell properties because they describe each cell unit.

mathematical manipulation of the denominator, the area ($m^2$) is raised to the 3/2 power to transform the dimensional property into volume with correct units ($m^3$). The same correlative effect is applied to the number of cells for consistency. Therefore, cell density is independently measured and calculated from the average bulk properties, as shown in Table 4 and Table 5. Cell properties such as cell length, cell width, and cell wall thickness are also independently measured and the average is calculated, also as shown in Table 4 and Table 5. By comparing independent values, quantitative correlations may be established to predict the occurrence of wrinkling during mechanical convolution of a material based solely on comparison of independent variables.

TABLE 4

Test Analysis Data From Iterations 1-18

| Iteration # | Number of Cells in Strip (cells) | Strip Length (mils) | Strip Thickness (mils) | Cell Density (cells/in$^3$) | Cell Length (Mils) | Cell Width (Mils) | Cell Wall Thickness (Mils) | Cell Aspect Ratio |
|---|---|---|---|---|---|---|---|---|
| 1 | 265 | 654.48 | 59.05 | $5.68 \times 10^5$ | 14.22 | 7.33 | 0.96 | 1.94 |
| 2 | 101 | 521.43 | 84.41 | $1.10 \times 10^5$ | 34.28 | 10.87 | 1.83 | 3.15 |
| 3 | 398 | 693.10 | 60.79 | $9.18 \times 10^5$ | 11.94 | 6.70 | 0.78 | 1.78 |
| 4 | 290 | 635.96 | 68.79 | $5.40 \times 10^5$ | 19.78 | 6.56 | 0.93 | 3.02 |
| 5 | 500 | 759.73 | 70.83 | $8.96 \times 10^5$ | 16.43 | 5.30 | 0.84 | 3.10 |
| 6 | 457 | 692.33 | 69.96 | $9.16 \times 10^5$ | 17.01 | 5.22 | 0.77 | 3.26 |
| 7 | 281 | 752.03 | 66.41 | $4.22 \times 10^5$ | 18.45 | 8.28 | 0.96 | 2.23 |
| 8 | 276 | 754.69 | 69.28 | $3.84 \times 10^5$ | 19.54 | 8.53 | 1.02 | 2.29 |
| 9 | 402 | 833.86 | 62.49 | $6.78 \times 10^5$ | 8.09 | 5.92 | 0.88 | 1.37 |
| 10 | 421 | 833.37 | 70.72 | $6.04 \times 10^5$ | 9.99 | 6.17 | 0.9 | 1.62 |
| 11 | 39 | 828.50 | 50.75 | $2.82 \times 10^4$ | 60.77 | 14.81 | 2.40 | 4.10 |
| 12 | 53 | 807.00 | 55.43 | $4.08 \times 10^4$ | 51.27 | 12.85 | 2.75 | 3.99 |
| 13 | 37 | 931.48 | 55.28 | $2.28 \times 10^4$ | 68.52 | 16.36 | 2.27 | 4.19 |
| 14 | 29 | 802.19 | 58.33 | $1.54 \times 10^4$ | 70.44 | 20.80 | 3.12 | 3.39 |
| 15 | 21 | 817.08 | 64.75 | $7.91 \times 10^3$ | 86.75 | 24.36 | 3.43 | 3.56 |
| 16 | 36 | 830.59 | 77.76 | $1.32 \times 10^4$ | 65.06 | 19.97 | 2.63 | 3.26 |
| 17 | 31 | 825.61 | 64.22 | $1.41 \times 10^4$ | 65.00 | 22.00 | 2.99 | 2.95 |
| 18 | 28 | 832.65 | 61.00 | $1.29 \times 10^4$ | 63.30 | 20.71 | 3.56 | 3.06 |

A total of five (5) different dimensional parameters were measured for iterations 19-50. In one exemplary embodiment, dimensional parameters of overall strip length (L), overall strip thickness (T), and total numbers of cells in the measured strip area (n) may be classified as bulk properties because they describe an overall cell property. In another exemplary embodiment, dimensional parameters of cell length (l) and cell width (w) may be classified as cell properties because they describe each cell unit.

Each set of dimensional values was separately analyzed to ascertain a correlation between bulk properties and cell properties. Cell density (p) was used to normalize each cell number value because each of the 50 iterations possessed a different number of cells per area (cells/m$^2$) due to different strip geometries. Cell density is calculated as the total number of cells in a given strip (n) divided by the overall strip length (L) and overall strip thickness (T), raised to the 3/2 power, as shown in Equation 1. Cell aspect ratio (A) is calculated as the average cell length (l) divided by the average cell width (w) of given iterations, as shown in Equation 2.

$$p = (n/TL)^{3/2} \quad \text{Equation 1:}$$

$$A = (l/w) \quad \text{Equation 2:}$$

Equation 1 transforms the units from cells per unit area (cells/in$^2$) into cells per unit volume (cells/in$^3$). Through

TABLE 5

Test Analysis Data from Iterations 19-50

| Iteration # | Cell Length | Cell Width | Cell Density | Cell Aspect Ratio |
|---|---|---|---|---|
| 19 | 14.73 | 5.60 | 6.007E+05 | 2.63 |
| 20 | 20.72 | 7.16 | 4.407E+05 | 2.89 |
| 21 | 22.04 | 5.92 | 4.791E+05 | 3.72 |
| 22 | 17.95 | 5.95 | 6.545E+05 | 3.02 |
| 23 | 18.41 | 6.20 | 5.602E+05 | 2.97 |
| 24 | 17.02 | 5.93 | 910587 | 2.87 |
| 25 | 17.48 | 5.29 | 971383 | 3.30 |
| 26 | 13.04 | 5.92 | 1230737 | 2.20 |
| 27 | 13.97 | 6.34 | 1260693 | 2.20 |
| 28 | 13.08 | 6.6 | 1420564 | 1.98 |
| 29 | 18.1 | 5.45 | 1099014 | 3.32 |
| 30 | 20.74 | 6.53 | 728556 | 3.18 |
| 31 | 13.2 | 6.45 | 1167341 | 2.05 |
| 32 | 11.72 | 5.87 | 1851158 | 2.00 |
| 33 | 16.08 | 5.48 | 1179837 | 2.93 |
| 34 | 25.03 | 6.35 | 683270 | 3.94 |
| 35 | 14.02 | 6.05 | 1215786 | 2.32 |
| 36 | 11.54 | 5.94 | 1544317 | 1.94 |
| 37 | 10.59 | 5.46 | 1630729 | 1.94 |
| 38 | 10.71 | 5.52 | 1650454 | 1.94 |
| 39 | 10.78 | 6.1 | 1713915 | 1.77 |
| 40 | 16.14 | 5.43 | 1061618 | 2.97 |
| 41 | 19 | 5 | 911612 | 3.80 |

TABLE 5-continued

Test Analysis Data from Iterations 19-50

| Iteration # | Cell Length | Cell Width | Cell Density | Cell Aspect Ratio |
|---|---|---|---|---|
| 42 | 17.07 | 5.26 | 1159422 | 3.25 |
| 43 | 20.36 | 5.61 | 933041 | 3.63 |
| 44 | 14.81 | 6.51 | 1006006 | 2.27 |
| 45 | 12.57 | 6.05 | 1405602 | 2.08 |
| 46 | 12.99 | 6.38 | 1345104 | 2.04 |
| 47 | 13.5 | 6.03 | 1355593 | 2.24 |
| 48 | 21.82 | 6.69 | 751112.4 | 3.26 |
| 49 | 15.74 | 5.24 | 1005240 | 3.00 |
| 50 | 11.07 | 5.31 | 1962021 | 2.08 |

Example 2: Test Results

By correlating cell density bulk property to cell length, cell width, and cell wall thickness cell properties, a strong correlation was found that may predict dimensional properties with respect to cell density, and subsequently cell area. The coefficient of determination ($R^2$) values produced by Microsoft Excel 2010 power law regression fit demonstrates a high degree of accuracy with regard to the validity of the fitted power law-based model. The power law has an equation form of two dependent variables, x and y, and two independent variables or constants, A and K, as shown in Equation 3 and Equation 4:

$$y = Ax^K \qquad \text{Equation 3:}$$

$$x = (y/A)^{1/K} \qquad \text{Equation 4:}$$

Figure 16:
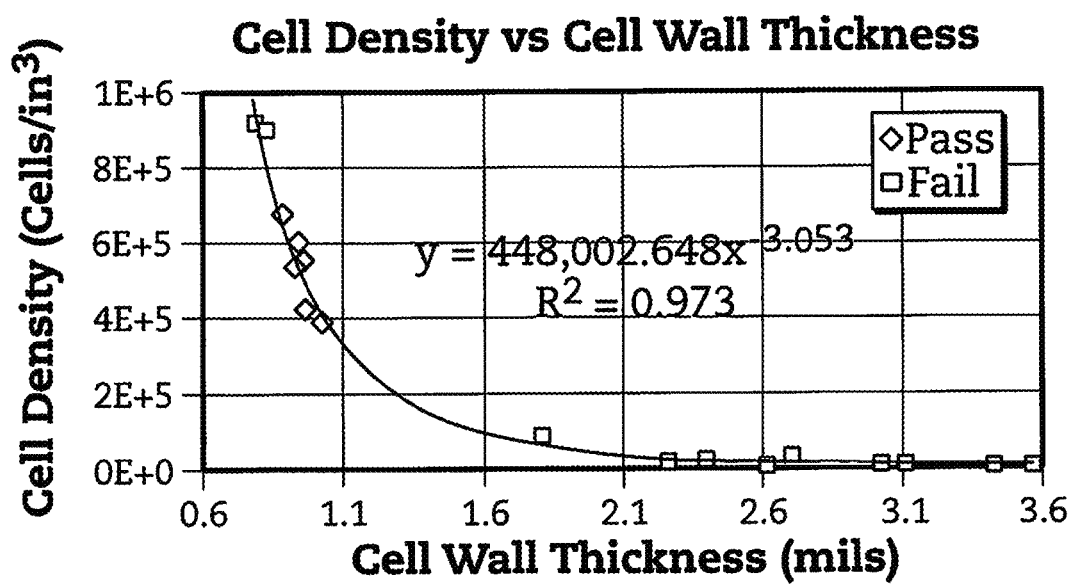
FIG. 16 is a graph with a power law regression fit of cell density vs. cell wall thickness in an x-y plot for the axial directions of insulative cups made from insulative cellular polypropylene-based materials of the present disclosure where the power law equation for predicting cell wall thickness with respect to cell density is $y=448,002.648x^{-3.053}$ and $R^2=0.973$.
Figure 17:
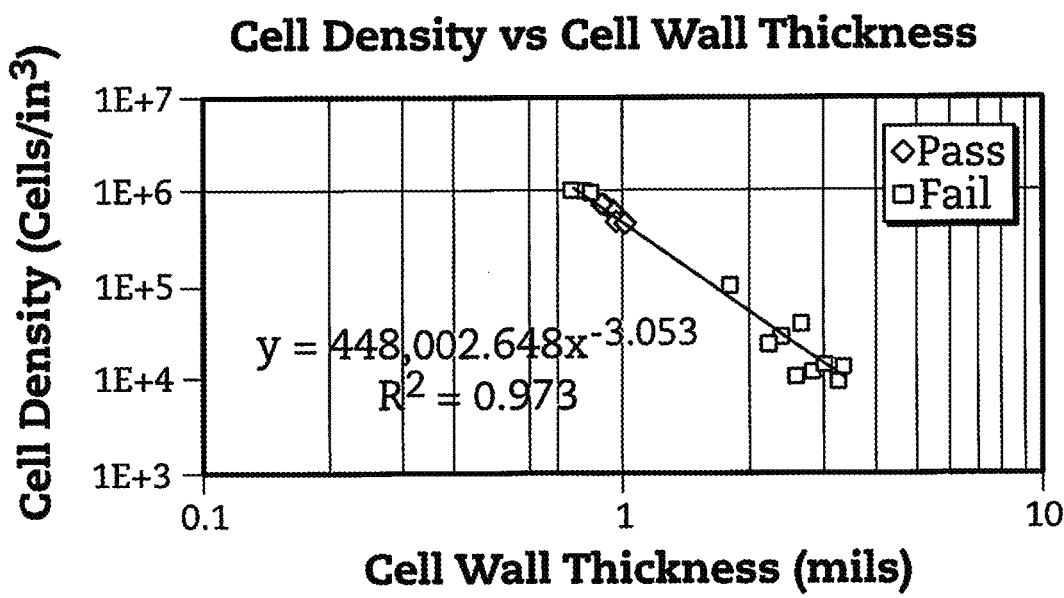
FIG. 17 is a graph with a power law regression fit of cell density vs. cell wall thickness in a log-log plot for the axial directions of insulative cups made from insulative cellular polypropylene-based materials of the present disclosure where the power law equation for predicting cell wall thickness with respect to cell density is $y=448,002.648x^{-3.053}$ and $R^2=0.973$.
Figure 18:
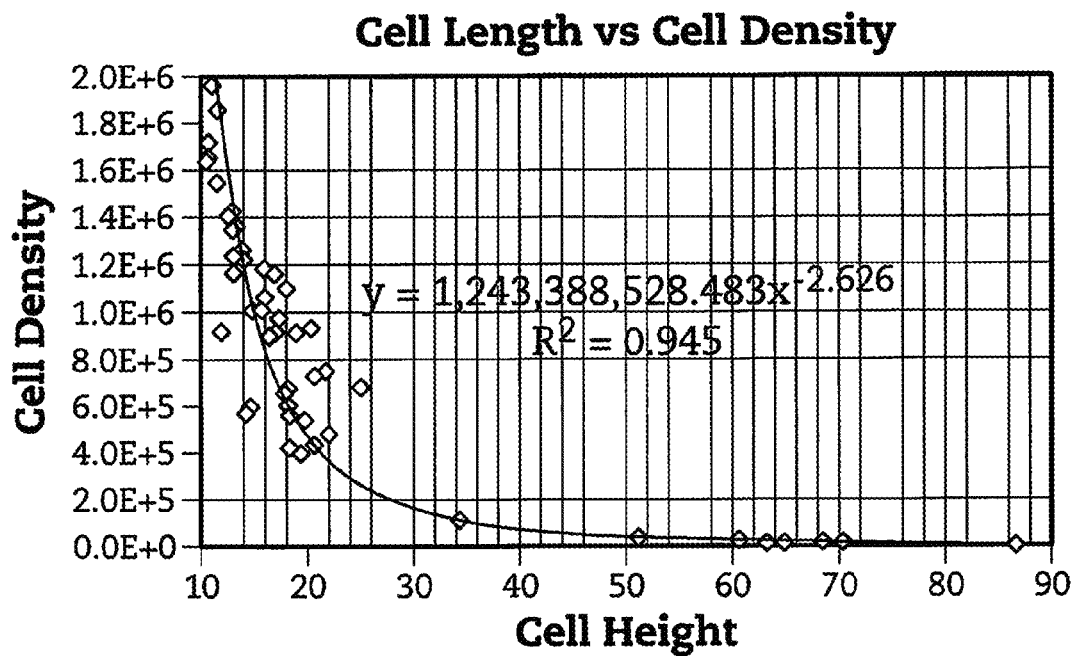
FIG. 18 is a graph with a power law regression fit of cell density vs. cell length in an x-y plot for the axial directions of insulative cups made from insulative cellular polypropylene-based materials of the present disclosure where the power law equation for predicting cell length with respect to cell density is $y=1,243,388,528.484x^{-2.626}$ and $R^2=0.945$.
Figure 19:
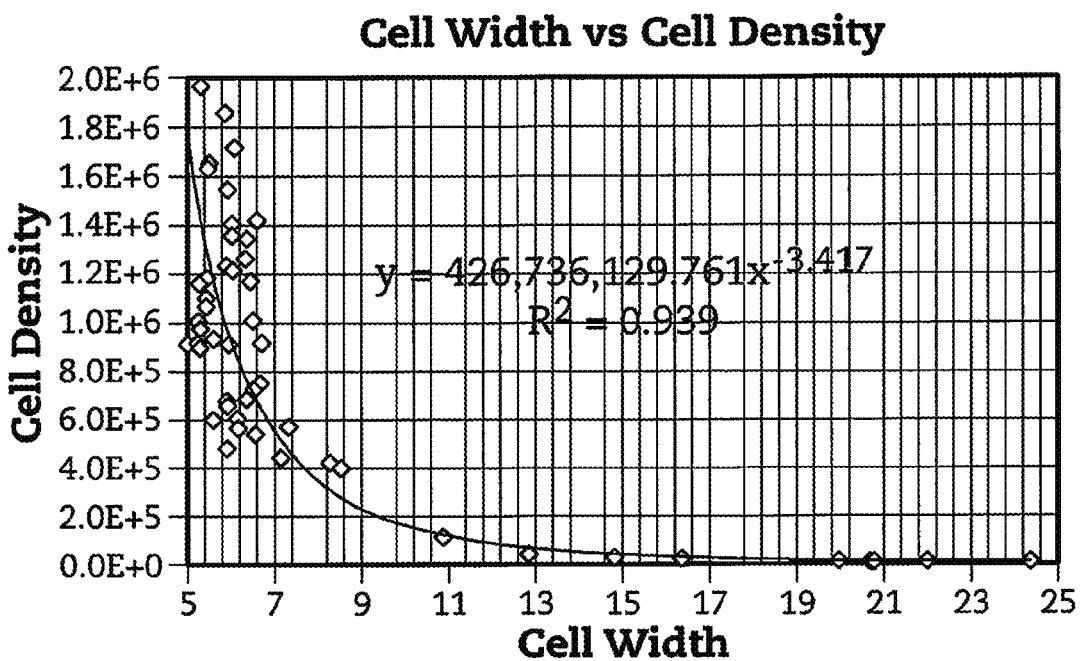
FIG. 19 is a graph with a power law regression fit of cell density vs. cell width in an x-y plot for the axial directions of insulative cups made from insulative cellular polypropylene-based materials of the present disclosure where the power law equation for predicting cell width with respect to cell density is $y=426,736,129.761x^{-3.417}$ and $R^2=0.939$.

In exemplary embodiments, cell density may predict cell length, cell width, and cell wall thickness with $R^2$ values of 0.945, 0.939, and 0.973 as shown in FIG. 18, FIG. 19 and FIG. 16, respectively. The closer the $R^2$ value is to 1, the more accurate the model fit. It is generally accepted that a regression fit value greater than 0.85 demonstrates a strong quantitative correlation between two independent variables, which, in this case, are represented by bulk properties and cell properties.

In exemplary embodiments, the equation for predicting cell length with respect to cell density may be y=1,243,388,528.483$x^{-2.626}$, wherein the power law constants for predicting cell length with respect to cell density are A=1,243,388,528.483 and K=−2.626. In other exemplary embodiments, the equation for predicting cell width with respect to cell density may be y=426,736,129.761$x^{-3417}$ wherein the power law constants for predicting cell width with respect to cell density are A=426,736,129.761 and K=−3.417. In other exemplary embodiments, the equation for predicting cell wall thickness with respect to cell density may be y=448,002.648$x^{-3653}$ wherein the power law constants for predicting cell wall thickness with respect to cell density are A=448,002.648 and K=−3.053.

Figure 20:
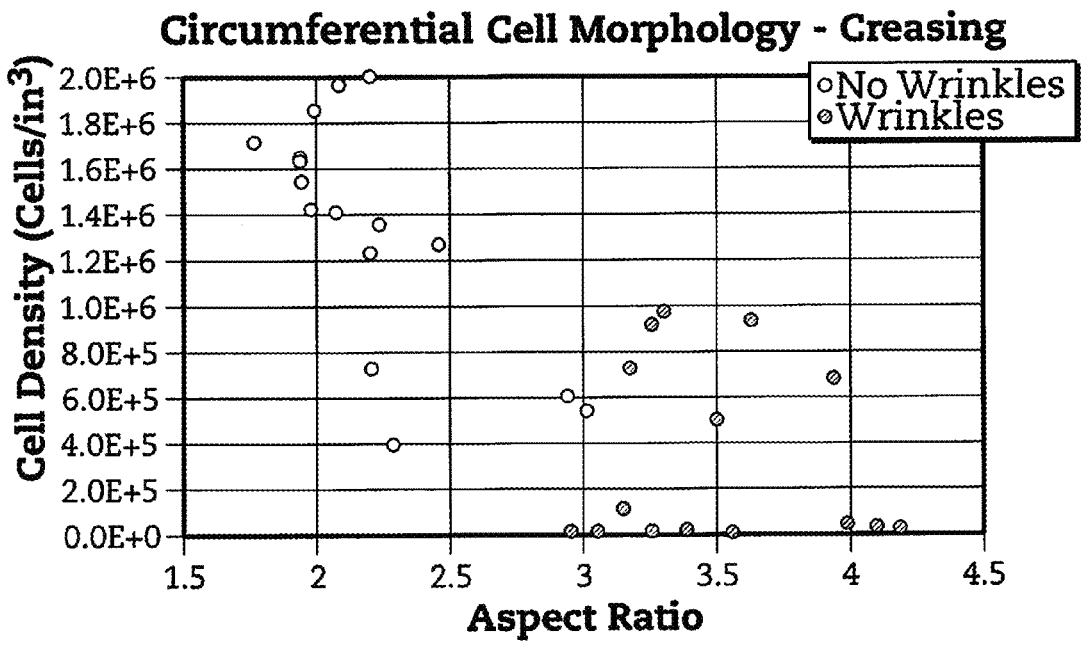
FIG. 20 is an x-y plot of cell density vs. circumferential direction cell aspect ratio illustrating the effect of circumferential direction cell morphology on creasing.
Figure 21:
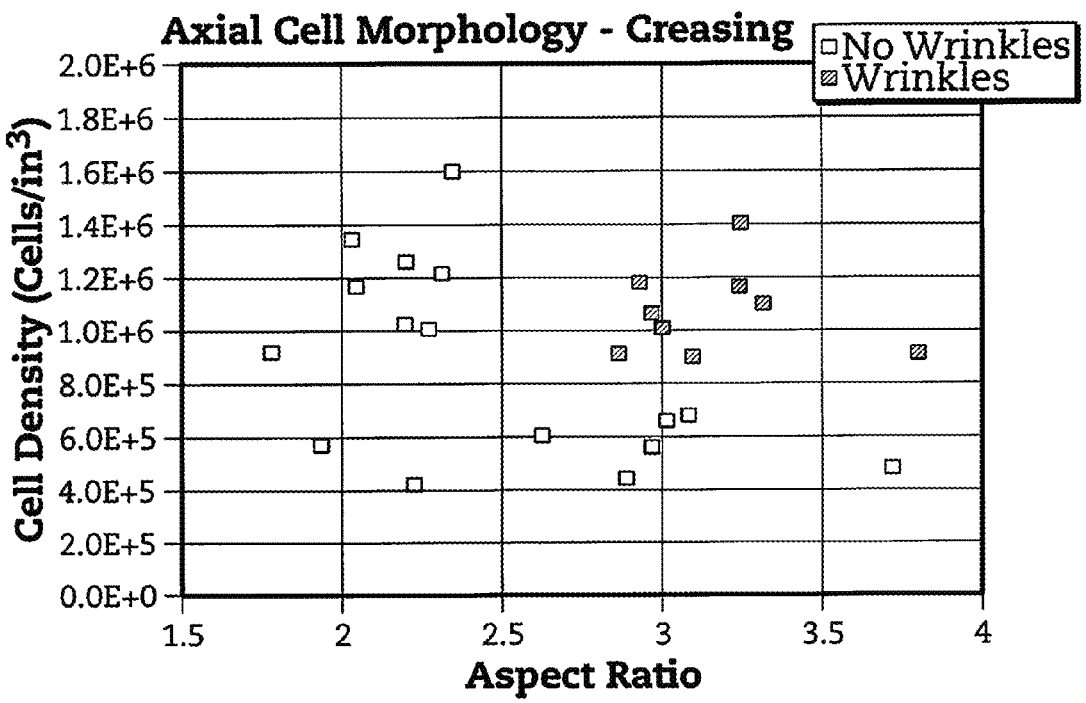
FIG. 21 is an x-y plot of cell density vs. axial direction cell aspect ratio illustrating the effect of axial direction cell morphology on creasing.

The data also illustrate a satisfactory range where insulative cellular polypropylene-based material possesses wrinkles, as defined by Wrinkles and Minimal Wrinkles, where Wrinkles means the cup possesses wrinkles and/or creases and Minimal Wrinkles means wrinkles and/or creases are not present. As shown in FIG. 20 and FIG. 21, the data may be organized in both the circumferential direction and axial direction. From interpretation of the data in FIG. 20, it may be seen that the aspect ratio of cells that run parallel to the circumference (i.e., in the circumferential direction) may not only play an important role in determining a tendency to wrinkle during convolution, but a more important role than that of either cell density or the aspect ratio of cells running perpendicular to the circumference (i.e., in the axial direction, as shown in FIG. 21).

In exemplary embodiments as suggested by FIG. 20, insulative cellular polypropylene-based material that possesses a cell aspect ratio of less than about 2.75 in the circumferential direction of an article, such as an insulative cup, may not wrinkle when convoluted into the article. Illustratively, insulative cellular polypropylene-based material that possesses a cell aspect ratio of 2.5 or less in the circumferential direction of an article, such as an insulative cup, may not wrinkle when convoluted into the article. In other exemplary embodiments as suggested by FIG. 21, insulative cellular polypropylene-based material that possesses a cell aspect ratio of less than about 2.75 in the axial direction of an article, such as an insulative cup, may not wrinkle when convoluted into the article. Illustratively, insulative cellular polypropylene-based material that possesses a cell aspect ratio of 2.5 or less in the axial direction of an article, such as an insulative cup, may not wrinkle when convoluted into the article. In other exemplary embodiments as suggested by FIG. 21, insulative cellular polypropylene-based material that possesses a cell aspect ratio of about 2.75 to about 4.00 in the axial direction of an article, such as an insulative cup, and a cell density of about 300,000 cells/in$^3$ to about 900,000 cells/in$^3$ may not wrinkle when convoluted into the article. In other exemplary embodiments as suggested by FIG. 20, insulative cellular polypropylene-based material that possesses a cell aspect ratio of about 2.75 to about 3.5 in the circumferential direction of an article, such as an insulative cup, and a cell density of about 300,000 cells/in$^3$ to about 700,000 cells/in$^3$ may not wrinkle when convoluted into the article.

The cell prediction model accurately describes cell growth in the cell width, cell length, and cell wall thickness category and possesses power law functionality, similarly to that seen in many natural phenomena. By taking on a log-log plot form, the correlation is unexpectedly a straight line that penetrates near or through all data points with accuracy. This development provides further evidence for power law correlation and subsequently the ability to model and predict cell growth, as shown in FIGS. 12-17.

As presaged by the cell morphology versus micro-creasing/macro-creasing results shown in FIGS. 12-15, and as summarily illustrated in FIG. 20 and FIG. 21, the present disclosure permits the identification of a control range with respect to cell aspect ratio and cell density, which range permits the manufacture of insulative cups that wrinkle and/or crease. FIG. 20 illustrates cell densities in a (cup) convolution process as a function of cell aspect ratio in the circumferential direction, whereas FIG. 21 illustrates cell densities in a (cup) convolution process as a function of cell aspect ratio in the axial direction. In FIG. 20 and FIG. 21, cell densities that have Minimal Wrinkles are not tolerated because of the lack of wrinkling and/or creasing during cup convolution. Conversely, cell densities in FIG. 20 and FIG. 21 that are associated with wrinkling and/or creasing during cup convolution, i.e., that Wrinkles, result in micro-creasing and/or macro-creasing, where micro-creasing and/or macro-creasing are defined as follows:

Micro-Creasing defines small creases inside the cup found in the middle, top, and especially bottom areas; they are generally ¼" to ½" in length and near invisible to the eye unless you look for them.

Macro-Creasing defines large creases inside the cup that run all the way from the bottom to top or tangent to the cup; they are generally cup-length and very visible to the eye.

The invention claimed is:

1. An insulative cellular polypropylene-based material comprising
    a first polymer material comprising at least one high melt strength polypropylene homopolymer and
    a second polymer material comprising at least one polymer selected from the group consisting of crystalline polypropylene homopolymer, impact polypropylene copolymer, and mixtures thereof,
    wherein the material has wrinkles or creases, and
    having a cell aspect ratio in the axial direction of greater than about 2.5.

2. The insulative cellular polypropylene-based material of claim 1 having a cell aspect ratio in an axial direction of greater than about 2.75.

3. The insulative cellular polypropylene-based material of claim 2 having a cell aspect ratio in the circumferential direction of greater than about 2.5.

4. The insulative cellular polypropylene-based material of claim 3 having a cell aspect ratio in the circumferential direction of greater than about 2.75.

5. The insulative cellular polypropylene-based material of claim 4 having a cell aspect ratio in the circumferential direction of greater than about 3.0.

6. The insulative cellular polypropylene-based material of claim 5 having a cell aspect ratio in the circumferential direction of greater than about 3.25.

7. The insulative cellular polypropylene-based material of claim 6 having a cell aspect ratio in the circumferential direction of greater than about 3.5.

8. The insulative cellular polypropylene-based material of claim 1 having a cell aspect ratio in the circumferential direction of greater than about 2.5.

9. The insulative cellular polypropylene-based material of claim 8 having a cell aspect ratio in the circumferential direction of greater than about 2.75.

10. The insulative cellular polypropylene-based material of claim 9 having a cell aspect ratio in the circumferential direction of greater than about 3.0.

11. The insulative cellular polypropylene-based material of claim 10 having a cell aspect ratio in the circumferential direction of greater than about 3.25.

12. The insulative cellular polypropylene-based material of claim 11 having a cell aspect ratio in the circumferential direction of greater than about 3.5.

13. An insulative cellular polypropylene-based material comprising
    a first polymer material comprising at least one high melt strength polypropylene homopolymer and
    a second polymer material comprising at least one polymer selected from the group consisting of crystalline polypropylene homopolymer, impact polypropylene copolymer, and mixtures thereof,
    wherein the material has wrinkles or creases, and
    having a cell aspect ratio in the axial direction of about 2.75 to about 3.75 and a cell density of greater than about 800,000 cells/in$^3$.

14. An insulative cellular polypropylene-based material comprising
    a first polymer material comprising at least one high melt strength polypropylene homopolymer and
    a second polymer material comprising at least one polymer selected from the group consisting of crystalline polypropylene homopolymer, impact polypropylene copolymer, and mixtures thereof,
    wherein the material has wrinkles or creases, and
    having a cell density of less than about 1,000,000 cells/in$^3$ and a cell aspect ratio in the circumferential direction greater than about 2.75.

* * * * *